United States Patent
Kumar et al.

(10) Patent No.: US 12,250,743 B2
(45) Date of Patent: Mar. 11, 2025

(54) DATA COLLECTION ENHANCEMENTS FOR SECONDARY CELL GROUPS

(71) Applicant: QUALCOMM Incorporated, San Diego, CA (US)

(72) Inventors: Rajeev Kumar, San Diego, CA (US); Punyaslok Purkayastha, San Diego, CA (US); Shankar Krishnan, San Diego, CA (US); Xipeng Zhu, San Diego, CA (US); Ozcan Ozturk, San Diego, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/384,584

(22) Filed: Jul. 23, 2021

(65) Prior Publication Data
US 2023/0026279 A1   Jan. 26, 2023

(51) Int. Cl.
*H04W 76/19*     (2018.01)
*H04W 24/02*     (2009.01)
(Continued)

(52) U.S. Cl.
CPC ........... *H04W 76/19* (2018.02); *H04W 24/02* (2013.01); *H04W 24/04* (2013.01); *H04W 24/08* (2013.01);
(Continued)

(58) Field of Classification Search
CPC . H04W 76/19; H04W 24/08; H04W 74/0833; H04W 36/00692; H04W 24/10;
(Continued)

(56) References Cited

U.S. PATENT DOCUMENTS

2022/0116825 A1 * 4/2022 Shibata ............... H04W 72/569
2022/0132333 A1   4/2022 Mattam et al.
(Continued)

FOREIGN PATENT DOCUMENTS

WO   WO-2021028893 A1   2/2021
WO   WO-2021029800 A1   2/2021

OTHER PUBLICATIONS

"3rd Generation Partnership Project, Technical Specification Group Radio Access Network, Evolved Universal Terrestrial Radio Access, Radio Resource Control, Protocol Specification (Release 16)", 3GPP Standard, Technical Specification, 3GPP TS 36.331, 3rd Generation Partnership Project, Mobile Competence Centre, 650, Route Des Lucioles, F-06921 Sophia-Antipolis Cedex, France vol. RAN WG2, No. V16.5.0, Jul. 6, 2021, XP052030167, pp. 1-1091.
(Continued)

*Primary Examiner* — Ninos Donabed
*Assistant Examiner* — Najeeb Ansari
(74) *Attorney, Agent, or Firm* — Paul McAdams; Holland & Hart LLP

(57) ABSTRACT

Methods, systems, and devices for wireless communications are described. In some examples, a user equipment (UE) may support dual connectivity. That is, the UE may establish communications with a master node and a secondary node of a wireless communications network. The master node may correspond to a master cell group (MCG) and the secondary node may correspond to a secondary cell group (SCG). In some examples, as described herein, the UE operating in dual connectivity may collect data for optimization of the wireless communications network or upon detecting a failure associated with the master cell group or the SCG and transmit the collected data to a network entity (e.g., one of the master node or the secondary node), where the collected data is based on the SCG being in a deactivated state. In some examples, upon receiving the collected data, the network entity may attempt to recover from the failure.

2 Claims, 19 Drawing Sheets

(51) Int. Cl.
*H04W 24/04* (2009.01)
*H04W 24/08* (2009.01)
*H04W 36/00* (2009.01)
*H04W 74/0833* (2024.01)

(52) U.S. Cl.
CPC .. *H04W 74/0833* (2013.01); *H04W 36/00692* (2023.05)

(58) Field of Classification Search
CPC .............................. H04W 76/27; H04W 76/15; H04W 24/02–04
See application file for complete search history.

(56) References Cited

U.S. PATENT DOCUMENTS

| | | | |
|---|---|---|---|
| 2022/0394620 A1* | 12/2022 | Hu | H04W 36/0069 |
| 2023/0007686 A1* | 1/2023 | Belleschi | H04W 74/0808 |
| 2024/0064840 A1* | 2/2024 | Xu | H04W 24/10 |

OTHER PUBLICATIONS

Huawei (Summary Rapporteur): "Summary on 8.13.3.1 Immediate MDT Enhancements", 3GPP TSG-RAN WG2 Meeting #112 electronic, R2-2010698, 3rd Generation Partnership Project, Mobile Competence Centre, 650, Route Des Lucioles,F-06921 Sophia-Antipolis Cedex, France, vol. RAN WG2, No. electronic, Nov. 2, 2020-Nov. 13, 2020 Oct. 31, 2020, XP051950004, 14 Pages, abstract pp. 56-57, figure 6.

International Search Report and Written Opinion—PCT/US2022/036554—ISA/EPO—Oct. 14, 2022 (2104758WO).

Qualcomm Incorporated: "UE Behaviour in SCG Deactivated State", 3GPP TSG-RAN WG2 Meeting #113-e, R2-2101871, 3rd Generation Partnership Project, Mobile Competence Centre, 650, Route Des Lucioles, F-06921 Sophia-Antipolis Cedex, France, vol. RAN WG2, No. E-meeting, Jan. 25, 2021-Feb. 5, 2021 Jan. 15, 2021, XP051974733, 7 Pages.

* cited by examiner

DATA COLLECTION ENHANCEMENTS FOR SECONDARY CELL GROUPS

FIELD OF TECHNOLOGY

The following relates to wireless communications, including data collection enhancements for secondary cell groups (SCGs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may operate in dual connectivity mode. In dual connectivity mode, the UE may establish a connection with two different base stations (e.g., a master node and a secondary node). The UE may communicate with the secondary node over a secondary cell group (SCG) and the master node over a master cell group (MCG). In some examples, the SCG may be in an activated state or a deactivated state. While the SCG is in a deactivated state, the UE may not transmit or receive data messages from the secondary cell over the SCG, but, in some cases, may monitor link quality associated with the SCG.

SUMMARY

The described techniques relate to improved methods, systems, devices, and apparatuses that support data collection enhancements for secondary cell groups (SCGs). Generally, the described techniques provide for a UE operating in a dual connectivity mode to report information related to an SCG (e.g., a state of the SCG) to the network. In some examples, a UE may transmit one or more reports to the network in the event that a connection failure occurs with a base station or otherwise to assess or improve the quality of service in relation to the base station (e.g., in support of network optimization techniques, including potentially machine-learning-based network optimization techniques), where the base station may be secondary node or a master node. For example, the UE may transmit a connection establishment failure (CEF) report to the network when a connection establishment failure in a primary cell occurs. As described herein, the one or more reports may be enhanced to include information related to the SCG, such as information related to a state of the SCG or failures associated with the SCG or radio link quality of SCG cell(s). Examples of the one or more reports may include an SCG failure information message, a random access (RA) report, a radio link failure (RLF) report, a mobility history report, an immediate minimization of drive test (MDT) report, or a logged MDT report.

A method for wireless communications at a UE is described. The method may include establishing communications with a master node and a secondary node of a wireless communications network, the master node corresponding to an MCG and the secondary node corresponding to an SCG, collecting data for optimization of the wireless communications network or based on detecting a failure associated with the MCG or the SCG, where the collected data is based on the SCG being in a deactivated state, and transmitting the collected data to a network entity including the secondary node or the master node.

An apparatus for wireless communications at a UE is described. The apparatus may include a processor, memory coupled with the processor, and instructions stored in the memory. The instructions may be executable by the processor to cause the apparatus to establish communications with a master node and a secondary node of a wireless communications network, the master node corresponding to an MCG and the secondary node corresponding to an SCG, collect data for optimization of the wireless communications network or based on detecting a failure associated with the MCG or the SCG, where the collected data is based on the SCG being in a deactivated state, and transmit the collected data to a network entity including the secondary node or the master node.

Another apparatus for wireless communications at a UE is described. The apparatus may include means for establishing communications with a master node and a secondary node of a wireless communications network, the master node corresponding to an MCG and the secondary node corresponding to an SCG, means for collecting data for optimization of the wireless communications network or based on detecting a failure associated with the MCG or the SCG, where the collected data is based on the SCG being in a deactivated state, and means for transmitting the collected data to a network entity including the secondary node or the master node.

A non-transitory computer-readable medium storing code for wireless communications at a UE is described. The code may include instructions executable by a processor to establish communications with a master node and a secondary node of a wireless communications network, the master node corresponding to an MCG and the secondary node corresponding to an SCG, collect data for optimization of the wireless communications network or based on detecting a failure associated with the MCG or the SCG, where the collected data is based on the SCG being in a deactivated state, and transmit the collected data to a network entity including the secondary node or the master node.

Some examples of the method, apparatuses, and non-transitory computer-readable medium described herein may further include operations, features, means, or instructions for measuring one or more signals received via the SCG, where the detected failure may be associated with the SCG and may be detected while the SCG may be in the deactivated state based on measuring the one or more signals received via the SCG, and transmitting the collected data includes transmitting an SCG failure information message including an indication of a failure type corresponding to the detected failure, or an indication of the deactivated state of the SCG, or both.

In some examples of the method, apparatuses, and non-transitory computer-readable medium described herein, the SCG failure information message further includes a duration between the state of the SCG being the deactivated state and the UE detecting the failure, or a duration between the UE detecting the failure and the UE receiving a radio resource control (RRC) reconfiguration message, or both.

In some examples of the method, apparatuses, and non-transitory computer-readable medium described herein, the failure type includes one of a failure associated with radio link monitoring (RLM) or a failure associated with beam failure detection (BFD).

Some examples of the method, apparatuses, and non-transitory computer-readable medium described herein may further include operations, features, means, or instructions for receiving, from the network entity and during a procedure to resume a connected state with the SCG, an indication of whether to change a state of the SCG and transmitting, to the network entity, a CEF report including an indication of the state of the SCG, or one or more radio measurement values associated with the SCG, or both.

Some examples of the method, apparatuses, and non-transitory computer-readable medium described herein may further include operations, features, means, or instructions for performing a random access procedure to change the state of the SCG from the deactivated state to an activated state and transmitting, to the network entity and after performing the random access procedure, a RA report including an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE or the network entity, or an indication of one or more contention-free random access resources used for the random access procedure, or any combination thereof.

Some examples of the method, apparatuses, and non-transitory computer-readable medium described herein may further include operations, features, means, or instructions for performing a connection reestablishment procedure based on the detected failure, where the detected failure may be associated with a handover procedure to switch from the master node to a second master node corresponding to a second MCG, and where the SCG may be in the deactivated state at a time of the detected failure, and transmitting the collected data includes transmitting, after performing the connection reestablishment procedure, an RLF report including an SCG failure information message that includes an indication of a failure type corresponding to the detected failure, or an indication of the deactivated state of the SCG, or both, an indication of the detected failure, an indication of the deactivated state of the SCG, an indication of one or more RLM measurement values associated with the SCG, or an indication of one or more radio resource management (RRM) measurement values associated with the SCG, or any combination thereof.

Some examples of the method, apparatuses, and non-transitory computer-readable medium described herein may further include operations, features, means, or instructions for attempting to perform an MCG recovery procedure based on a failure associated with the MCG, where the detected failure may be associated with the SCG and occurs during the MCG recovery procedure and performing a connection reestablishment procedure based on the MCG recovery procedure failing, where transmitting the collected data includes transmitting, after performing the connection reestablishment procedure, an RLF report including an SCG failure information message that includes an indication of a failure type corresponding to the detected failure, or an indication of the deactivated state of the SCG, or both.

Some examples of the method, apparatuses, and non-transitory computer-readable medium described herein may further include operations, features, means, or instructions for attempting to perform an MCG recovery procedure based on the detected failure, where the detected failure may be associated with the MCG and identifying that one or more measurement values associated with the SCG may be degrading while attempting to perform the MCG recovery procedure, where transmitting the collected data includes transmitting, based on the detected failure, an MCG failure information message including an indication of one or more RLM measurement values associated with the MCG, or an indication of one or more RLM measurement values associated with the SCG, or both.

Some examples of the method, apparatuses, and non-transitory computer-readable medium described herein may further include operations, features, means, or instructions for transmitting, to the network entity, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

Some examples of the method, apparatuses, and non-transitory computer-readable medium described herein may further include operations, features, means, or instructions for transmitting, to the network entity, an intermediate MDT report including one or more measurement values associated with the SCG and an indication of a corresponding state of the SCG for the one or more measurement values.

Some examples of the method, apparatuses, and non-transitory computer-readable medium described herein may further include operations, features, means, or instructions for transmitting, to the network entity, a logged MDT report including an indication of the state of the SCG, or whether dual connectivity may be configured at the UE, or both.

A method for wireless communications at a master node corresponding to an MCG within a wireless communications network is described. The method may include establishing communications with a UE and receiving data for optimization of the wireless communications network or based on a failure associated with the MCG or an SCG corresponding to a secondary node, where the collected data is based on the SCG being in a deactivated state.

An apparatus for wireless communications at a master node corresponding to an MCG within a wireless communications network is described. The apparatus may include a processor, memory coupled with the processor, and instructions stored in the memory. The instructions may be executable by the processor to cause the apparatus to establish communications with a UE and receive data for optimization of the wireless communications network or based on a failure associated with the MCG or an SCG corresponding to a secondary node, where the collected data is based on the SCG being in a deactivated state.

Another apparatus for wireless communications at a master node corresponding to an MCG within a wireless communications network is described. The apparatus may include means for establishing communications with a UE and means for receiving data for optimization of the wireless communications network or based on a failure associated with the MCG or an SCG corresponding to a secondary node, where the collected data is based on the SCG being in a deactivated state.

A non-transitory computer-readable medium storing code for wireless communications at a master node corresponding to an MCG within a wireless communications network is described. The code may include instructions executable by a processor to establish communications with a UE and receive data for optimization of the wireless communications network or based on a failure associated with the MCG or an SCG corresponding to a secondary node, where the collected data is based on the SCG being in a deactivated state.

In some examples of the method, apparatuses, and non-transitory computer-readable medium described herein, receiving the data may include operations, features, means, or instructions for receiving an SCG failure information message from the UE based on the failure, where the failure may be associated with the SCG, and where the SCG failure information message includes an indication of a failure type corresponding to the failure, or an indication of the deactivated state of the SCG, or both.

In some examples of the method, apparatuses, and non-transitory computer-readable medium described herein, the SCG failure information message further includes a duration between the state of the SCG being the deactivated state and the UE detecting the failure, or a duration between the UE detecting the failure and the UE receiving a RRC reconfiguration message, or both.

In some examples of the method, apparatuses, and non-transitory computer-readable medium described herein, the failure type includes one of a failure associated with RLM or a failure associated with BFD.

Some examples of the method, apparatuses, and non-transitory computer-readable medium described herein may further include operations, features, means, or instructions for receiving, from the UE and based on a procedure for the UE to resume a connection with the SCG, a CEF report including an indication of the state of the SCG, or one or more radio measurement values associated with the SCG, or both.

Some examples of the method, apparatuses, and non-transitory computer-readable medium described herein may further include operations, features, means, or instructions for receiving, from the UE and based on a random access procedure for the UE to change the state of the SCG from the deactivated state to an activated state, an RA report including an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE, the secondary node, or the master node, an indication of one or more contention-free random access resources used for the random access procedure, or any combination thereof.

Some examples of the method, apparatuses, and non-transitory computer-readable medium described herein may further include operations, features, means, or instructions for performing a connection reestablishment procedure with the UE based on the failure, where the failure may be associated with a handover procedure for the UE to switch from the master node to a second master node corresponding to a second MCG, and where the SCG may be in the deactivated state at a time of the failure, and receiving the data includes receiving, after performing the connection reestablishment procedure, an RLF report including an SCG failure information message that includes an indication of a failure type corresponding to the failure, or an indication of the deactivated state of the SCG, or both, an indication of the failure, an indication of the deactivated state of the SCG, an indication of one or more RLM measurement values associated with the SCG, or an indication of one or more RRM measurement values associated with the SCG, or any combination thereof.

Some examples of the method, apparatuses, and non-transitory computer-readable medium described herein may further include operations, features, means, or instructions for attempting to perform an MCG recovery procedure with the UE based on a failure associated with the MCG, where the failure may be associated with the SCG and occurs during the MCG recovery procedure and performing a connection reestablishment procedure with the UE based on the MCG recovery procedure failing, where receiving the data includes receiving, after performing the connection reestablishment procedure, an RLF report including an SCG failure information message that includes an indication of a failure type corresponding to the failure, or an indication of the deactivated state of the SCG, or both.

Some examples of the method, apparatuses, and non-transitory computer-readable medium described herein may further include operations, features, means, or instructions for attempting to perform an MCG recovery procedure based on the failure, where the failure may be associated with the MCG, and where receiving the data includes receiving, based on the failure, an MCG failure information message including an indication of one or more RLM measurement values associated with the MCG, or an indication of one or more RLM measurement values associated with the SCG, or both.

Some examples of the method, apparatuses, and non-transitory computer-readable medium described herein may further include operations, features, means, or instructions for receiving, from the UE, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

Some examples of the method, apparatuses, and non-transitory computer-readable medium described herein may further include operations, features, means, or instructions for receiving, from the UE, an intermediate MDT report including one or more measurement values associated with the SCG and an indication of a corresponding state of the SCG.

Some examples of the method, apparatuses, and non-transitory computer-readable medium described herein may further include operations, features, means, or instructions for receiving, from the UE, a logged MDT report including an indication of the state of the SCG, or whether dual connectivity may be configured at the UE, or both.

Some examples of the method, apparatuses, and non-transitory computer-readable medium described herein may further include operations, features, means, or instructions for measuring a rate at which SCG activation was requested by a network entity or the UE, a number of successful SCG activations or deactivations, a number of times random access was performed for SCG activation, a number of failed SCG activations or deactivations, an SCG activation delay, an SCG deactivation delay, a duration between consecutive SCG activation or deactivations, or a set of triggers for secondary cell activation or deactivation, or any combination thereof.

DETAILED DESCRIPTION

In some examples, a user equipment (UE) may support dual connectivity. Dual connectivity may allow a UE to establish a connection with a first base station and additionally establish a connection with a second base station. One of the base stations may be known as the master node and the other base station may be known as the secondary node. The master node may communicate with the UE over cells that make up a master cell group (MCG) and the secondary node may communicate with the UE over cells that make up a secondary cell group (SCG). In some examples, while the SCG is connected, the SCG may be in an activated state or deactivated state. SCG activation or deactivation may be requested by the UE, the secondary node, or the master node. In some examples, even if the SCG is in an deactivated state, the UE may receive (e.g., periodically) signals over the SCG and make measurements based on these signals. If a signal quality associated with the SCG deteriorates excessively (e.g., one or more associated signal quality measurements drops below one or more corresponding thresholds), the UE may determine that the SCG has failed.

In some wireless communications networks, if the SCG fails while the SCG is in a deactivated state, information provided by the UE related to the SCG failure may be limited. But as described, one or more reports from a UE to a network may be enhanced by including information related to the SCG state (or status) in the reports. For example, in response to a UE detecting an SCG failure, the UE may provide an SCG failure information message, which may be enhanced to include one or more of the type of failure that occurred on the SCG, the state of the SCG, a duration that has elapsed since the SCG went into a deactivated state until the last failure was detected, or a duration that has elapsed since the failure was detected until the UE receives an radio resource control (RRC) reconfiguration message. Additionally or alternatively, reports such as a connection establishment failure (CEF) report, random access (RA) report, radio link failure (RLF) report, mobility history report, immediate minimization of drive test (MDT) report, and logged MDT reports may be updated to include information related to SCG status, failures associated with the SCG, radio link quality measurements associated with the SCG, or any combination thereof. In some examples, adding the above information to the reports may allow for faster SCG recovery when compared to other methods, for improved optimization of networks to prevent or otherwise mitigate the impact of SCG failures, or any combination thereof.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to data collection enhancements for SCGs.

Figure 1:
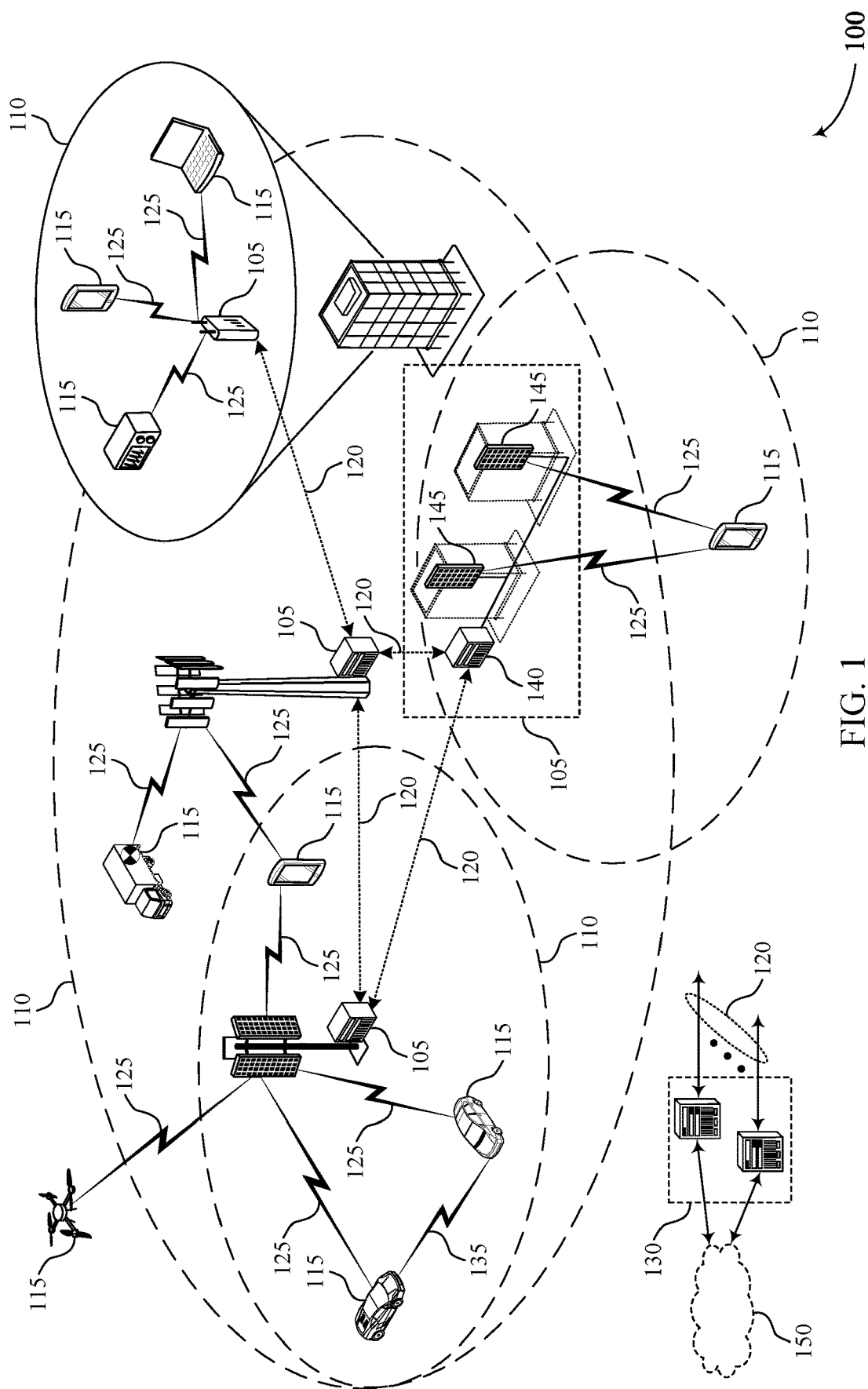
FIGS. 1 and 2 illustrate examples of a wireless communications system that supports data collection enhancements for secondary cell groups (SCGs) in accordance with aspects of the present disclosure.

FIG. 1 illustrates an example of a wireless communications system 100 that supports data collection enhancements for SCGs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the UE 115 may operate in a dual connectivity mode. That is, the UE 115 may establish communications with a master node and additionally establish communications with a secondary node. The cells on which the UE 115 communicates with the master node may be known as a MCG and the cells on which the UE 115 communicates with the secondary node may be known as an SCG. The SCG may be in an activated state or a deactivated state. In some examples, the UE 115 may collect data associated with the master node or the secondary node for the purpose of communication optimization or in the event of a connection failure. For example, the UE 115 may transmit an SCG failure information message to the network (e.g., via the MCG) in the event that a failure associated with the SCG has occurred.

As described herein, the UE 115 may enhance data collection and reporting techniques such that data reported by the UE 115 includes information related to the state of the SCG (e.g., deactivated state) or failures on the SCG. As one example, the SCG failure information message may be enhanced to include an indication of the state of the SCG and the type of failure that occurred on the SCG. Additionally or alternatively, examples of reports that may be enhanced may be a CEF report, an RLF report, mobility history report, an immediate MDT report, a logged MDT report, RA report, etc. By including additional SCG-related information in the reports, the UE 115 may potentially recover from SCG failure (or other failures) at a faster rate than other methods, the wireless communications system 100 may be better optimized (e.g., through machine learning or other techniques based on the additional SCG-related information), or both.

Figure 2:
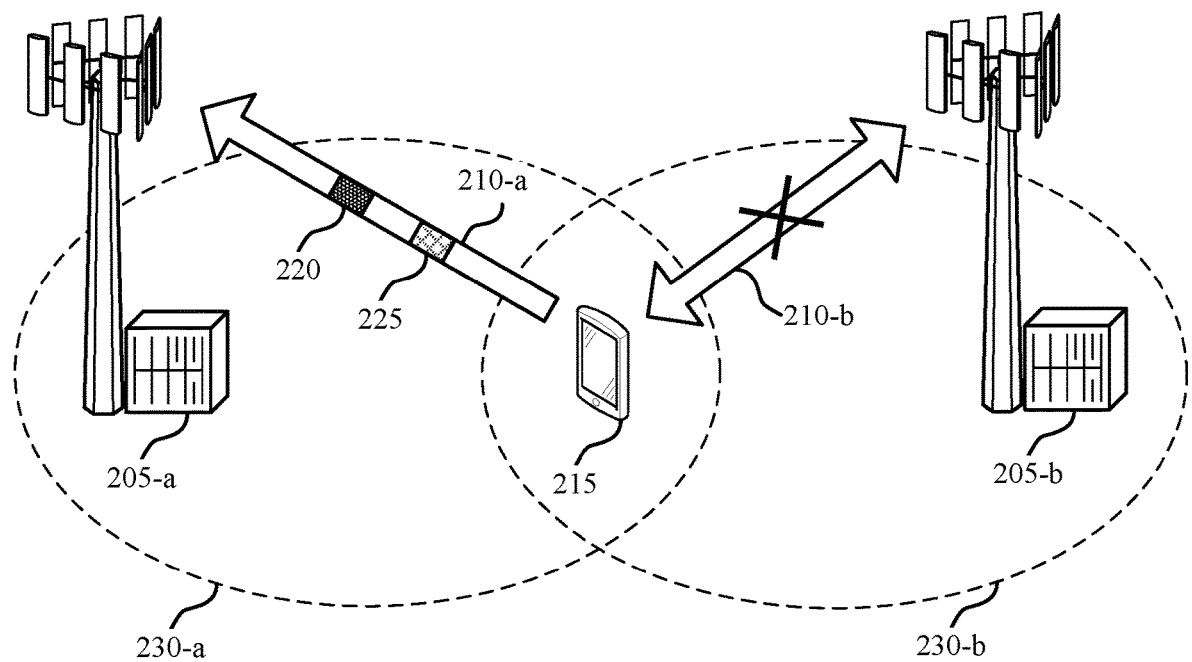

FIG. 2 illustrates an example of a wireless communications system 200 that supports data collection enhancements for SCGs in accordance with aspects of the present disclosure. In some examples, the wireless communications system 200 may implement aspects of a wireless communications system 100. For example, the wireless communications system 200 may include a base station 205-a, a base station 205-b, and a UE 215 which may be examples of base stations 105 and a UE 115 as described with reference to FIG. 1.

In some examples, the UE 215 may be capable of dual connectivity. That is, the UE 215 may be capable of establishing a communication link 210-a with a base station 205-a and a communication link 210-b with a base station 205-b. In some examples, the base station 205-a may be known as a master node and the base station 205-b may be known as a secondary node. Control plane and data plane functionality of the UE 215 may be handled by the master node, whereas only data plane functionality may be handled by the secondary node. In some examples, the base station 205-a and the base station 205-b may operate in accordance to the same radio access technology (RAT) or different RATs.

In some examples, the base station 205-a and the base station 205-b may support one or more cells 230. When carrier aggregation is used, a cell 230 may correspond to a component carrier for which the UE 215 and the base station 205 (e.g., the base station 205-a or the base station 205-b) are configured to use. The cell 230 that the UE 215 and the base station 205 (e.g., the base station 205-a or the base station 205-b) initially connects to may be known as primary cell and every cell 230 connected thereafter may be known as a secondary cell. An MCG may refer to the cells 230-a supported by the base station 205-a (e.g., master node) and a secondary cell group (SCG) may refer to the cells 230-b supported by the base station 205-b (e.g., secondary node).

In some examples, the network may configure the state of the SCG after the UE 215 establishes a communication link 210-b with the base station 205-b. The state of the SCG may include a deactivated state or an activated state. If the SCG is in the activated state, the UE 115-a may utilize full functionality of the SCG. Alternatively, if SCG is in the deactivate state, the UE 115-a may not utilize full functionality of the SCG and instead may only make periodic measurements (e.g., link quality measurements) related to the SCG. The network may configure the state of the SCG at primary secondary cell addition, primary cell change, RRC resume, or at handover. In some examples, the UE 215, the base station 205-a, or the base station 205-b may request a change in the SCG state. For example, SCG activation may be requested by the base station 205-b or the base station 205-a when data arrives at the base station 205-b or SCG activation may be requested by the UE 215 if data arrives on an SCG bearer at the UE 215. Alternatively, SCG deactivation may be requested by the base station 205-a and the base station 205-b. In either case, network initiated SCG activation or SCG deactivation may be indicated to the UE 215 via the MCG.

In some examples, the SCG may undergo a failure. The SCG failure may due to a radio link monitoring (RLM) issue or a beam failure detection (BFD) issue. In some examples, the SCG may be in the activated state when the failure occurs. In such example, upon detecting the failure, the UE 215 may transmit an SCG failure information message to the base station 205-a, where the SCG failure information message may include RLM measurements, BFD measurements, and beam level measurements. Based on the SCG failure information, the network may attempt to debug the secondary primary cell failure that happened in the SCG activated state. However, in some examples, the SCG may be in the deactivated state when the failure occurs and the current information included in SCG failure information message may not be sufficient to debug the primary secondary cell failure in the SCG deactivated state.

As described herein, the network may collect data associated with the status of the SCG (e.g., deactivated state) to assess quality of service or in the event of a connection establishment failure. As one example, the UE 215 may enhance an SCG failure information message 220 to include information related to the state of the SCG. In some examples, the SCG may be in the deactivated state and the UE 215 may detect an SCG failure (e.g., based on measurements related to RLM or BFD). Upon detecting the SCG failure, the UE 215 may transmit an SCG failure information message 220 to the base station 205-a via the MCG. Included in the SCG failure information message 220 may be an indication of an SCG failure type. The SCG failure type may be an RLM issue while the SCG was in the deactivated state (e.g., RLM-Issue-DeactivatedState) or a BFD issue while the SCG was in the deactivated state (e.g., BFD-Issue-ActivatedState). Additionally or alternatively, the SCG failure information message 220 may be enhanced to include an indication of the state of the SCG (e.g., deactivated state or activated state), or a time duration related to SCG activation or deactivation. As one example, the time duration may correspond to an amount of time that has elapsed from when the SCG group transitioned into the deactivated to when the SCG failure was detected (e.g., RLM issue or BFD issue) or an amount of time that has elapsed from when the SCG failure was detected to when the UE 215 receives an RRC reconfiguration message. Based on the information included in the SCG failure information message 220, the network may attempt to debug the SCG failure Additionally or alternatively, the UE 215 may enhance one or more reports 225 that are different from the SCG failure information message 220 to include information related to the state of the SCG. For example, the UE 215 may enhance an RA report, an RLF report, a CEF report, mobility history report, or MDT reports (e.g., logged MDT or immediate MDT) to include SCG state related information. These one or more reports may be sent to the network in an effort to assess quality of service or in the event of a connection failure.

As described above, the UE 215 may enhance a mobility history report to include information related to the state of the SCG. Mobility history report may be collected by the UE 215 or the network (e.g., base station 205-a) and may include information related to all primary secondary cells visited by the UE 215 as well as each of the primary secondary cell IDs and a time spent in each of the primary secondary cell. As described herein, the mobility history report may be enhanced to include a percentage of time spent in the primary secondary cell while the SCG is in an activated state or a time spent in the primary secondary cell while the SCG is in one state during the transmission to another state (e.g., from activated to deactivated or from deactivated to activated).

As another example, the UE 215 may enhance MDT reports to include information related to the state of the SCG. The network may collect MDT reports from the UE 215 or the base stations 205. MDT reports may allow that network to detect uplink or downlink holes in coverage. There may be two modes of MDT reporting, logged MDT reporting and immediate MDT reporting. As described herein, the immediate MDT report may be enhanced to include an indicator of whether SCG is in a deactivated state when RRM measurements are reported for the primary secondary cell of the SCG or neighboring primary secondary cells. Additionally or alternatively, the logged MDT report may be enhanced to include an indicator of whether multi-RAT dual connectivity (MR-DC) is configured at the UE 215. The UE 215 may include this indicator in the logged MDT report per logging period or the UE 215 may include the indicator in the logged report when the UE 215 transitions from an inactive state to a connected state and upon MR-DC configuration release. Additionally or alternatively, the logged MDT report may be enhanced to include an indication of the state of the SCG. Based on the enhanced logged MDT report, the network may configure cell reselection parameters to minimize a probability of the UE 215 going to the idle state resulting in the release of SCG. Additionally, the network may compute the average (or mean or maximum) amount of time before the UE 215 releases the SCG configuration and moves to the idle state from the inactive state.

Apart from receiving enhanced report including information related to the state of the SCG, the base station 205 (e.g., the base station 205-*a* or the base station 205-*b*) may measure one or more metrics (e.g., L2 measurements) related to SCG activation or deactivation. For example, the base station 205 may determine one or more of a rate at which SCG activation was requested by a network entity or the UE, a number (or percentage) of successful SCG activations or deactivations, a number (or percentage) of random access procedures performed for SCG activation, a number (or percentage) of failed SCG activations or deactivations, an SCG group activation delay, an SCG deactivation delay, a duration between consecutive SCG activation or deactivations, a set of triggers for SCG activation or deactivation (e.g., uplink data arrival on SCG bearer for activation or no pending data for deactivation), a method used by the UE 215 to activate or deactivate the SCG, a number of RRC connected users with SCG in a deactivated state or an activated state, a number of times the master node (e.g., the base station 205-*a*) changed the primary cell upon receiving a BFD indication, or a number of the master node (e.g., a base station 205-*a*) transmitted an RRC reconfiguration message upon receiving a BFD indication. The techniques as described herein may allow for more efficient SCG activation or deactivation, may allow for improved network performance (e.g., through machine learning or other optimization techniques based on the additional SCG-related information), or both.

Figure 3:
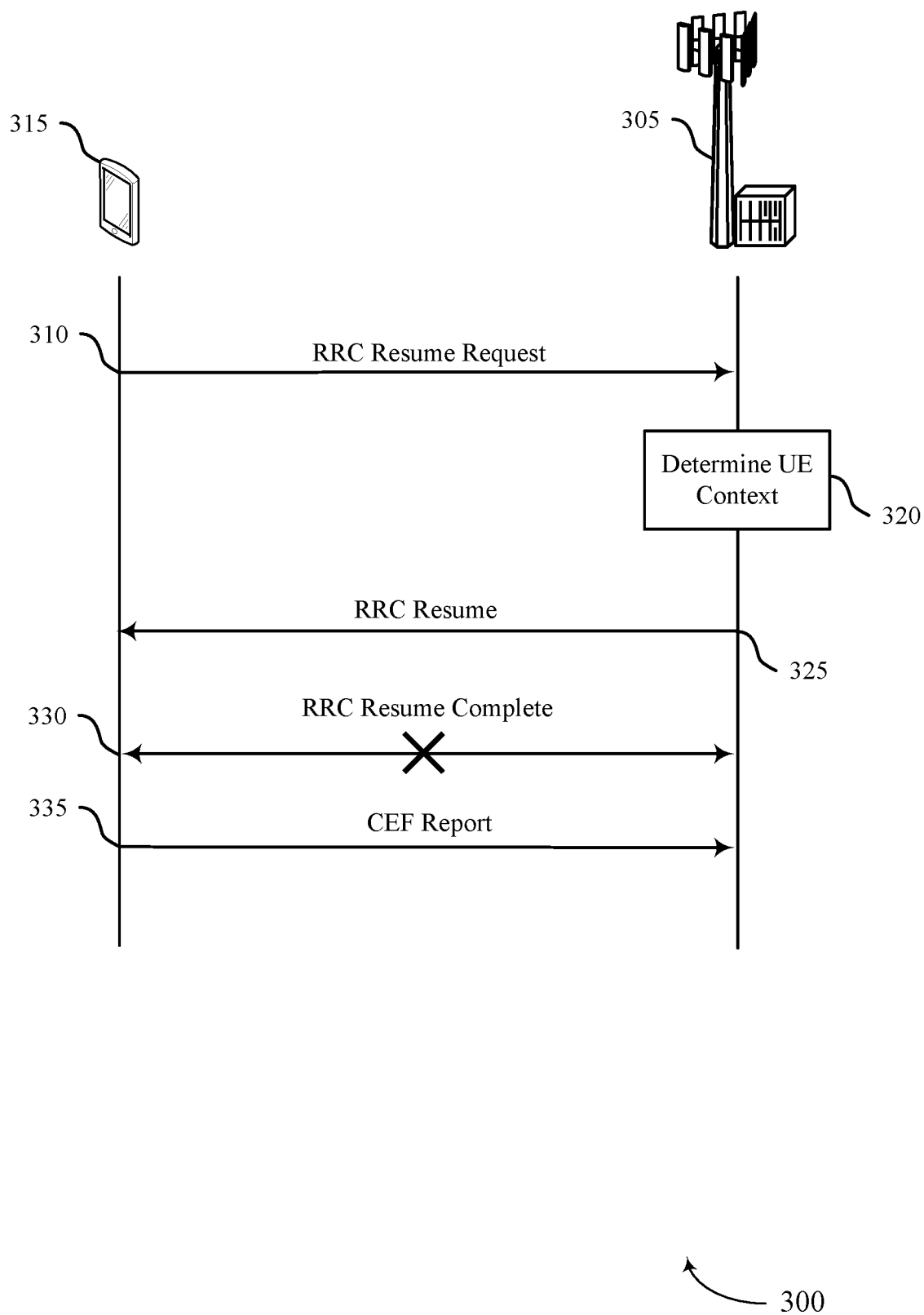
FIG. 3 through 7 illustrate examples of a process flow that supports data collection enhancements for SCGs in accordance with aspects of the present disclosure.

FIG. 3 illustrates an example of a process flow 300 that supports data collection enhancements for SCGs in accordance with aspects of the present disclosure. In some examples, the process flow 300 may implement or be implemented by aspects of a wireless communications system 100 or a wireless communications system 200. For example, the process flow 300 may be implemented by a UE 115 or a base station 105 as described with reference to FIG. 1. Alternative examples of the following may be implemented, where some steps are performed in a different order then described or are not performed at all. In some cases, steps may include additional features not mentioned below, or further steps may be added.

In some examples, the UE 315 may undergo an RRC resume connection procedure to transition from an RRC inactive state to an RRC connected state. The network may move the UE 315 to the RRC inactive state if there is no activity to or from the UE 315 for an extended period of time in an effort to save power. When the UE 315 needs to perform some activity, the network may transition the UE 315 from the RRC inactive state to the RRC connected state via the RRC resume connection procedure. In the RRC inactive state, the RRC connection may be suspended and the UE 315 may periodically monitor for paging messages from the network. When the UE 315 transitions to the RRC inactive state, the UE context (e.g., AS context) may be stored at the UE 315 and the last serving base station to reduce latency involved in transitioning to the RRC connected state.

At 310, the UE 315 may initiate the RRC resume connection procedure by transmitting an RRC resume request message (e.g., unprotected message) to the base station 305. In some examples, the UE 315 may be capable of dual connectivity and the base station 305 may be an example of a master node as described with reference to FIG. 2. Upon receiving the RRC resume request, the base station 305 may communicate with the last serving base station to determine the UE context at 320. In some examples, the UE context may include information such as the status or state (e.g., activated or deactivated) of the SCG in the case that the UE 315 is capable of dual connectivity.

At 325, the base station 305 may transmit an RRC resume message to the UE 315. The RRC resume message may indicate the state or status of the SCG. For example, the RRC resume message may include an indication to release the SCG, an indication to the change the state of the SCG (e.g., activated to deactivated or deactivated to activated), or an indication to keep the SCG state the same.

Once the UE 315 receives the RRC resume message, the UE 315 may consider itself in RRC connected mode and transmit an RRC resume complete message to the base station 305 at 330. In some examples, the RRC resume complete message may include an indication of the change in state of the SCG if the RRC resume message indicated to the change the state of the SCG at 325. Once complete, the RRC connection resume procedure may trigger a random access procedure between the UE 315 and the base station 305 enabling the UE 315 and the base station 305 to exchange data messages between one another.

However, one or more issues may arise during the RRC resume connection procedure and the UE 315 may be unable to establish an RRC connection with the base station 105-*a*. As one example, the base station 305 may unsuccessfully decode the RRC resume complete message at 330 causing an RRC connection failure. In such example, the UE may transmit a CEF report to the base station 305 at 335. As described herein, the CEF report may include some of the information previously included in the RRC resume message at 325. For example, the CEF report may include an indication of the state of the SCG indicated in the RRC resume message. Additionally or alternatively, the RRC resume message may include SCG configured radio measurements.

Figure 4:
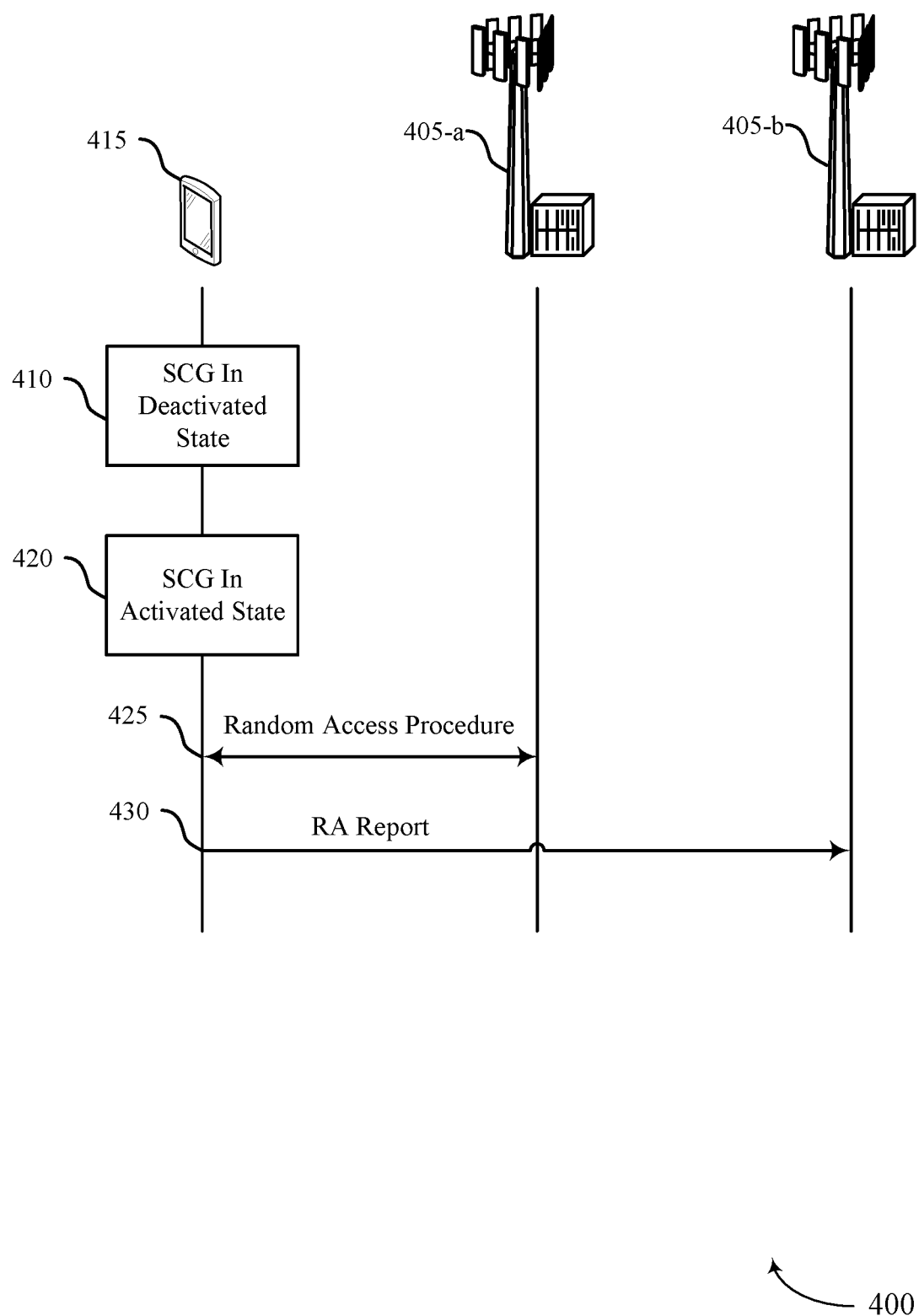

FIG. 4 illustrates an example of a process flow 400 that supports data collection enhancements for SCGs in accordance with aspects of the present disclosure. In some examples, the process flow 400 may implement or be implemented by aspects of a wireless communications system 100 or a wireless communications system 200. For example, the process flow 400 may be implemented by a UE 115 or a base station 105 as described with reference to FIG. 1. Alternative examples of the following may be implemented, where some steps are performed in a different order then described or are not performed at all. In some cases, steps may include additional features not mentioned below, or further steps may be added.

As described with reference to FIG. 2, the UE 415 may be capable of dual connectivity. That is, the UE 415 may establish a communication link with a base station 405-*a* and a base station 405-*b*, where the base station 405-*b* may be known as a master node and the base station 405-*a* may be known as a secondary node.

At 410, an SCG on which the UE 315 may communicate with the base station 405-*a* may be in a deactivated state. When the SCG is in the deactivated state, the UE 315 may not utilize the SCG to exchange data messages with the base station 405-*a*, but may, in some cases, monitor the quality of the link between the UE 315 and the base station 405-*a* (e.g., by conducting measurements related to RLM and BFD).

At 420, the UE 415 may receive some sort of indication to activate the SCG and transition the state of the SCG from the deactivated state to an activated state. SCG activation may be requested by the base station 405-*a*, the base station 405-*b*, or the UE 415. To transition the state of the SCG from the deactivated state to the activated state at 420, the UE 115-*a* may perform a random access procedure with the base station 405-*a* at 425. Successful completion of the random access procedure at 420 with the base station 405-*a* may enable the exchange of data messages between the base station 405-*a* and the UE 415 over the SCG.

During the random access procedure, the base station 405-*a* and the UE 415 may exchange multiple random access messages. In the case of contention free random access, the network may assign a preamble to the UE 415 and the UE 415 may transmit the assigned preamble (e.g., Msg1) to the base station 405-*a* to initiate the random access procedure. Upon receiving the preamble from the UE 415, the base station 405-*a* may transmit a random access response (RAR) message (e.g., Msg2) to the UE 415, where the RAR message may include timing alignment information as well a random access preamble ID (RAPID). Once the UE 415 receives the RAR message, the UE 415 may consider itself in RRC connected mode and may transmit Msg3 to the base station 405-*a*. In some examples, Msg3 may serve as scheduling request for the UE 415 and the base station 405-*a* may schedule the UE 115 to transmit data messages to the base station 405-*a* based on Msg3.

In some examples, one or more issues may occur during the random access procedure. For example, during contention free random access, the base station 405-*a* may not successfully decode Msg1 or Msg3 from the UE 415 or the UE 415 may not successfully decode Msg2 from the base station 405-*a*. In such example, the UE 415 may perform the random access procedure again or the UE 415 may initiate a different random procedure (e.g., contention based random access as opposed to contention free random access).

At 430, the UE 415 may successfully complete the random access procedure and transmit an RA report to the base station 405-*a* over a MCG. The RA report may include information related to random access procedures performed by the UE 415 (e.g., at 425). Additionally, as described herein, the RA report may include information related to the SCG. For example, the RA report may include a random access purpose that indicates that random access was performed in a primary secondary cell of the SCG due to SCG activation (e.g., SCGActivation) and in some examples, may also indicate whether a timing advance (TA) timer expiry occurred. Additionally, as described herein, the RA report may include a beam index (e.g., synchronization signal block (SSB) index or channel state information reference signal (CSI-RS) index) of a beam that was utilized during the random access procedure or a number of times the UE 415 attempted the random access procedure at 425 for SCG activation. This information may indicate to the base station 405-*b* whether the random access procedure at 425 was performed for initial access or the random access procedure at 425 was performed using configured or valid beams. Additionally, as described herein, the RA report may include an indication of which entity (e.g., the base station 405-*a*, the base station 405-*b*, or the UE 415) requested the SCG activation and a set of random access resources (e.g., contention free random access resources) used for SCG activation.

Figure 5:
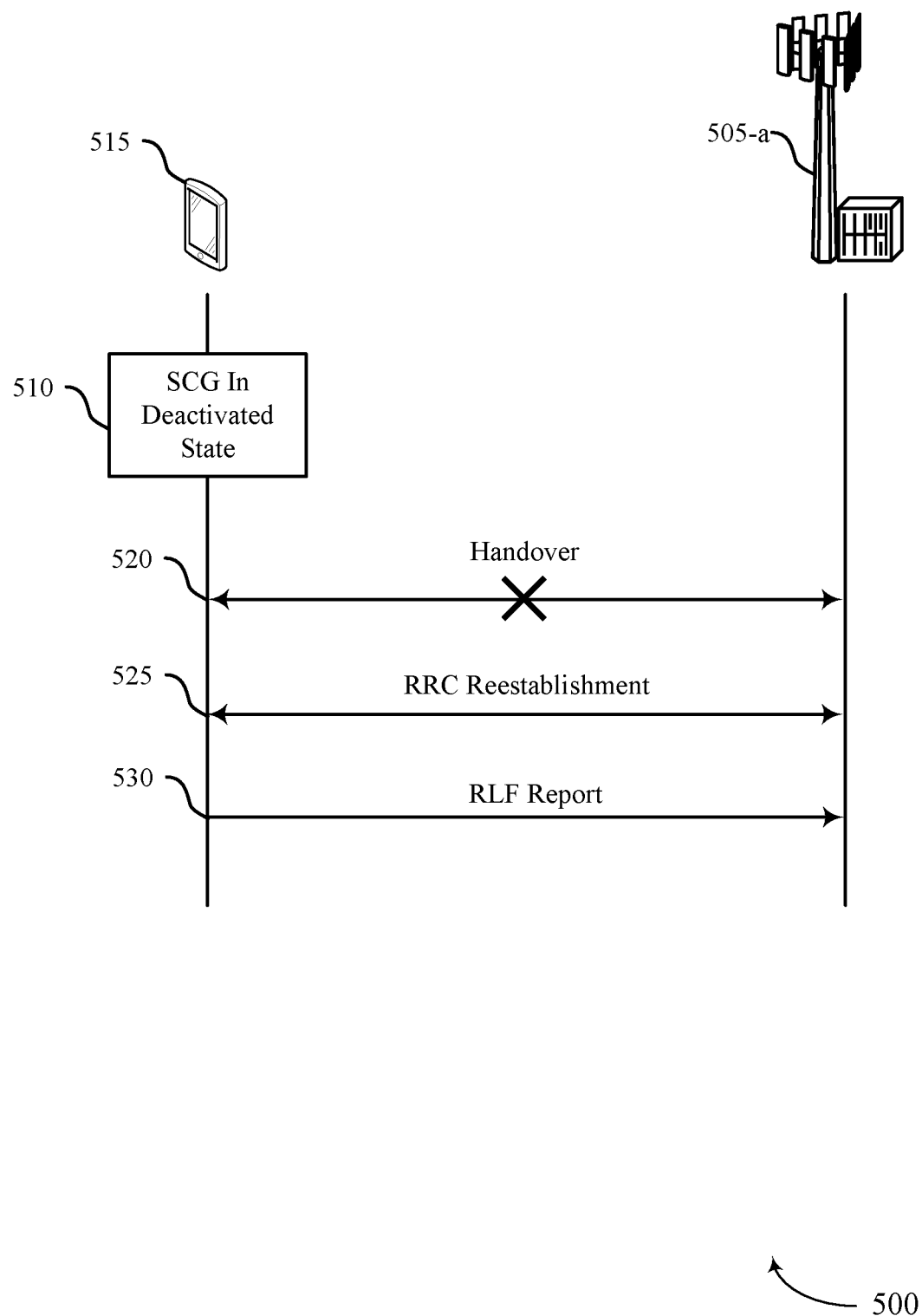

FIG. 5 illustrates an example of a process flow 500 that supports data collection enhancements for SCGs in accordance with aspects of the present disclosure. In some examples, the process flow 500 may implement or be implemented by aspects of a wireless communications system 100 or a wireless communications system 200. For example, the process flow 500 may be implemented by a UE 115 or a base station 105 as described with reference to FIG. 1. Alternative examples of the following may be implemented, where some steps are performed in a different order then described or are not performed at all. In some cases, steps may include additional features not mentioned below, or further steps may be added.

As described with reference to FIG. 2, the UE 515 may be capable of dual connectivity. That is, the UE 515 may establish a communication link with a master node and a communication link with a secondary node. The UE 515 may communicate with the master node over cells that make up what is known as the MCG and communicate with the secondary node over cells that make up what is known as the SCG.

At 510, the SCG on which the UE 515 may communicate with the secondary node may be in a deactivated state. When the SCG is in the deactivated state, the UE 315 may not utilize the SCG to exchange message with the secondary node, but may, in some cases, monitor a quality of the communication link between the UE 515 and the secondary node (e.g., by conducting measurements related to RLM and BFD).

In some examples, the UE 515 may leave a coverage area of a primary cell managed by the master node and enter a coverage area of a primary cell managed by a different master node (e.g., the base station 505). To switch from one master node to another, the UE 515 may perform a handover procedure at 520. During the handover procedure, the source master node and the target master node (e.g., base station 505) may exchange information related to the UE 515 such that the UE 515 may be moved to the target master node (e.g., base station 505). For example, the source master node may provide the target master node with an uplink packet data convergence protocol (PDCP) sequence number (SN) and primary focal node (PFN) receiver status, a downlink PDCP SN transmitter status, etc.

However, in some example, the handover procedure may fail. In such example, the UE may undergo an RRC reestablishment procedure with the base station 505 at 525. After successfully completing the RRC reestablishment procedure, the UE 515 may transmit an RLF report to the base station 505 at 530 (or alternatively to a different base station, such as the prior master node). As described herein, the RLF report may include an indication of the state of the SCG (e.g., deactivated state). Additionally, the RLF report may include RLM measurements and radio resource management (RRM) measurements associated with the SCG. In some examples, handover failure may be due to a RLM or BFD issue. In such example, the RLF report may include an indication that the failure type was a handover failure and a container including an SCG failure information message as described in FIG. 2.

Figure 6:
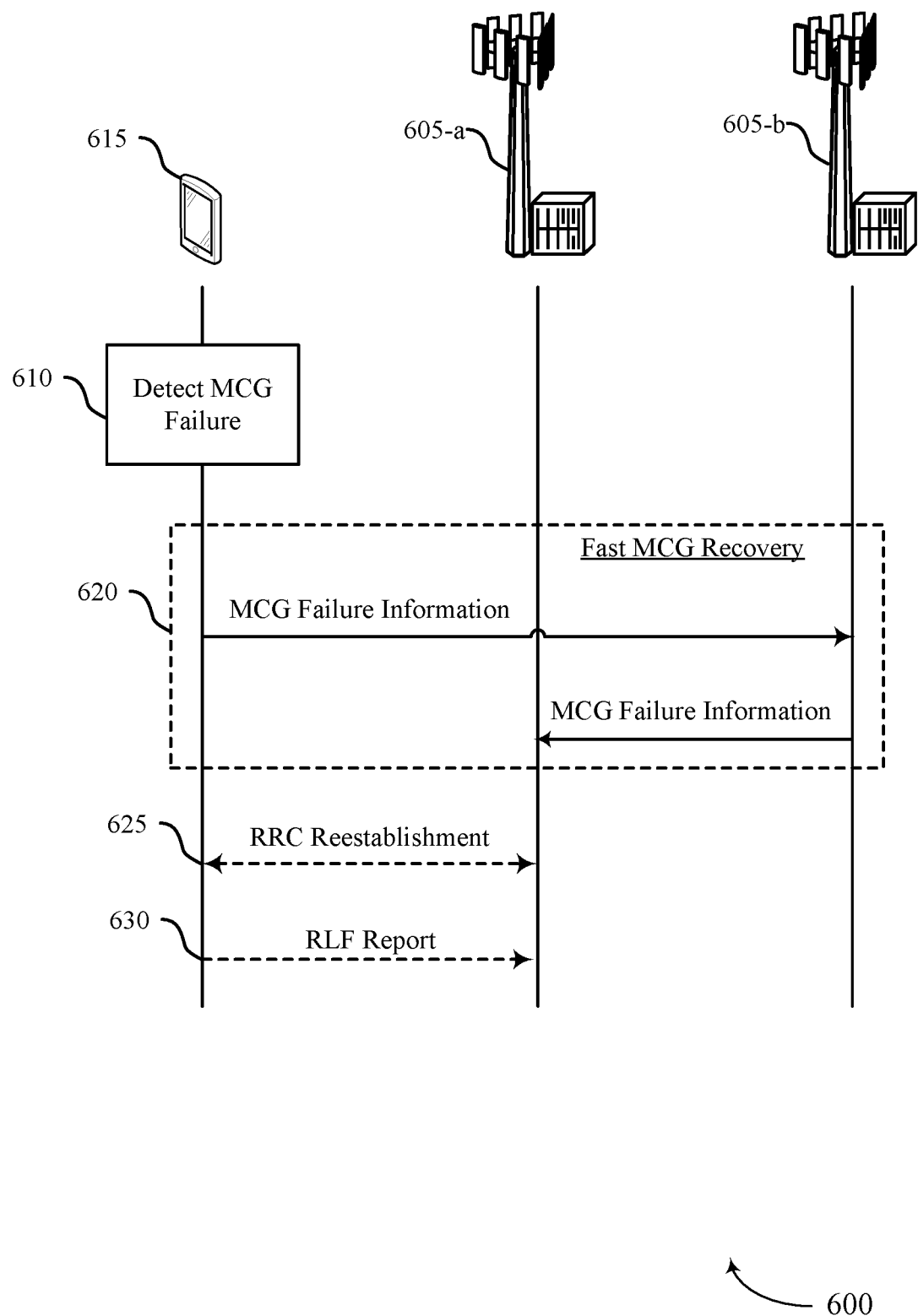

FIG. 6 illustrates an example of a process flow 600 that supports data collection enhancements for SCGs in accordance with aspects of the present disclosure. In some examples, the process flow 600 may implement or be implemented by aspects of a wireless communications system 100 or a wireless communications system 200. For example, the process flow 600 may be implemented by a UE 115 or a base station 105 as described with reference to FIG. 1. Alternative examples of the following may be implemented, where some steps are performed in a different order then described or are not performed at all. In some cases, steps may include additional features not mentioned below, or further steps may be added.

As described with reference to FIG. 2, the UE 615 may be capable of dual connectivity. That is, the UE 615 may establish a communication link with a base station 605-*a* and a communication link with a base station 605-*b*. The base station 605-*a* may be known as the master node and the base station 605-*b* may be known as the secondary node. The UE 515 may communicate with the master node over cells that make up what is known as the MCG and communicate with the secondary node over cells that make up what is known as the SCG.

At 610, the UE 615 may detect a MCG failure. In some examples, the MCG failure may be due to an RLM issue or a BFD issue. Upon detecting the MCG failure, the UE 615 may undergo fast MCG recovery at 620. During fast MCG recovery, the UE 615 may transmit a MCG failure information message to the base station 605-*b* over the SCG and the base station 605-*b* may forward the MCG failure information to the base station 605-*a*. The MCG failure information message may include the reason for failure (e.g., RLF or BFD) and any available measurements (e.g., RRM measurements) at the time of failure. The base station 605-*a* may utilize the MCG failure information to recover from the MCG failure. In some examples, during the fast MCG recovery, the UE 615 may determine that the SCG is degrading. The UE 615 may determine that SCG degrading when a T310 timer or N310 timer expires. In such example, as described herein, the MCG failure information message may be enhanced to include the most recent RLM measurements associated with the SCG and the MCG.

In some examples, the SCG may fail during the fast MCG recovery resulting in failure in the fast MCG recovery. In such example, the UE 615 may undergo a RRC reestablishment procedure with the base station 605-*a* at 625. Upon successfully completing the RRC reestablishment procedure, the UE 615 may transmit an RLF report to the base station 605-*a* at 630. As described herein, the RLF report may include the SCG failure information message as described with reference to FIG. 2 as a container.

Figure 7:
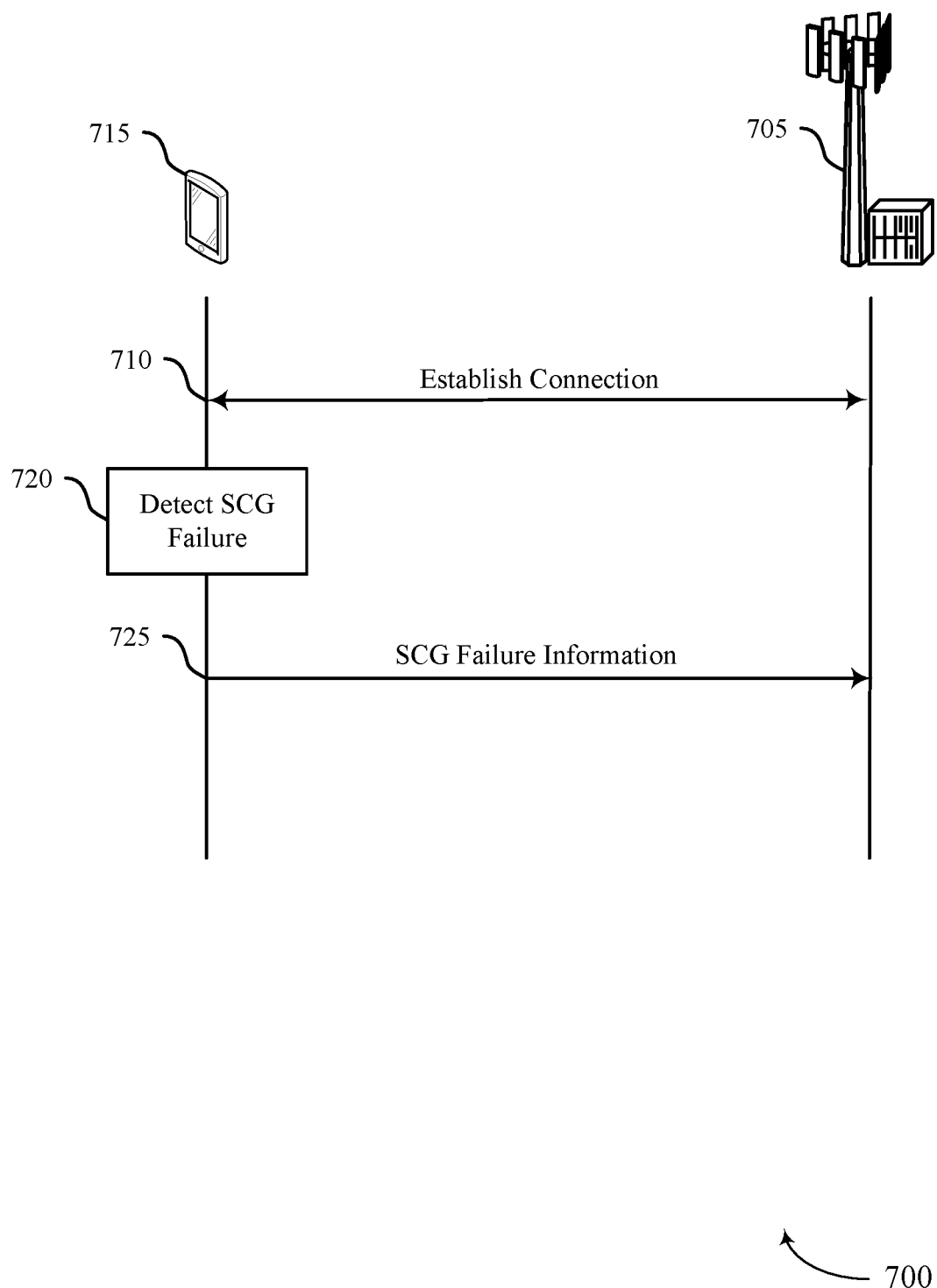

FIG. 7 illustrates an example of a process flow 700 that supports data collection enhancements for SCGs in accordance with aspects of the present disclosure. In some examples, the process flow 700 may implement or be implemented by aspects of a wireless communications system 100 or a wireless communications system 200. For example, the process flow 700 may be implemented by a UE 115 or a base station 105 as described with reference to FIG. 1. Alternative examples of the following may be implemented, where some steps are performed in a different order then described or are not performed at all. In some cases, steps may include additional features not mentioned below, or further steps may be added.

As described with reference to FIG. 2, the UE 715 may be capable of dual connectivity. That is, the UE 715 may establish a communication link with a master node and a communication link with a secondary node. The base station 705 may be an example of the master node. The UE 715 may communicate with the master node over cells that make up what is known as the MCG and communicate with the secondary node over cells that make up what is known as the SCG.

At 710, the UE 715 may establish communications with the base station 705. Similarly, the UE 715 may establish communication with a secondary node different from the base station 705.

At 720, the UE 715 may detect an SCG failure. In some examples, the UE 715 may detect an SCG failure based on one or more signals received over the SCG. The UE 715 may periodically conduct measurements on the one or more signals (e.g., reference signals) and if the measurements fall below a pre-configured threshold, the UE 715 may determine that the SCG has failed. In some examples, the SCG failure may be to a RLM issue (e.g., radio link quality issue) or a BFD issue (e.g., reference signal received power (RSRP) of a configured beam goes below a threshold).

Upon detecting the SCG failure, the UE 715 may transmit an SCG failure information message to the base station 705 over the MCG at 725. As described with reference to FIG. 2, the SCG failure information may include one or more of an indication of the state of the SCG (e.g., activated or deactivated), a failure type corresponding to the detected failure, a duration between that state of the SCG being in a deactivated state and the UE 715 detecting the failure, or a duration between the UE 715 detecting the failure and the UE receiving an RRC reconfiguration message. Based on the SC failure information, the base station 705 may decide to keep, change, or release the SCG. In some examples, the base station 705 may forward the SCG failure information message to the secondary node.

Figure 8:
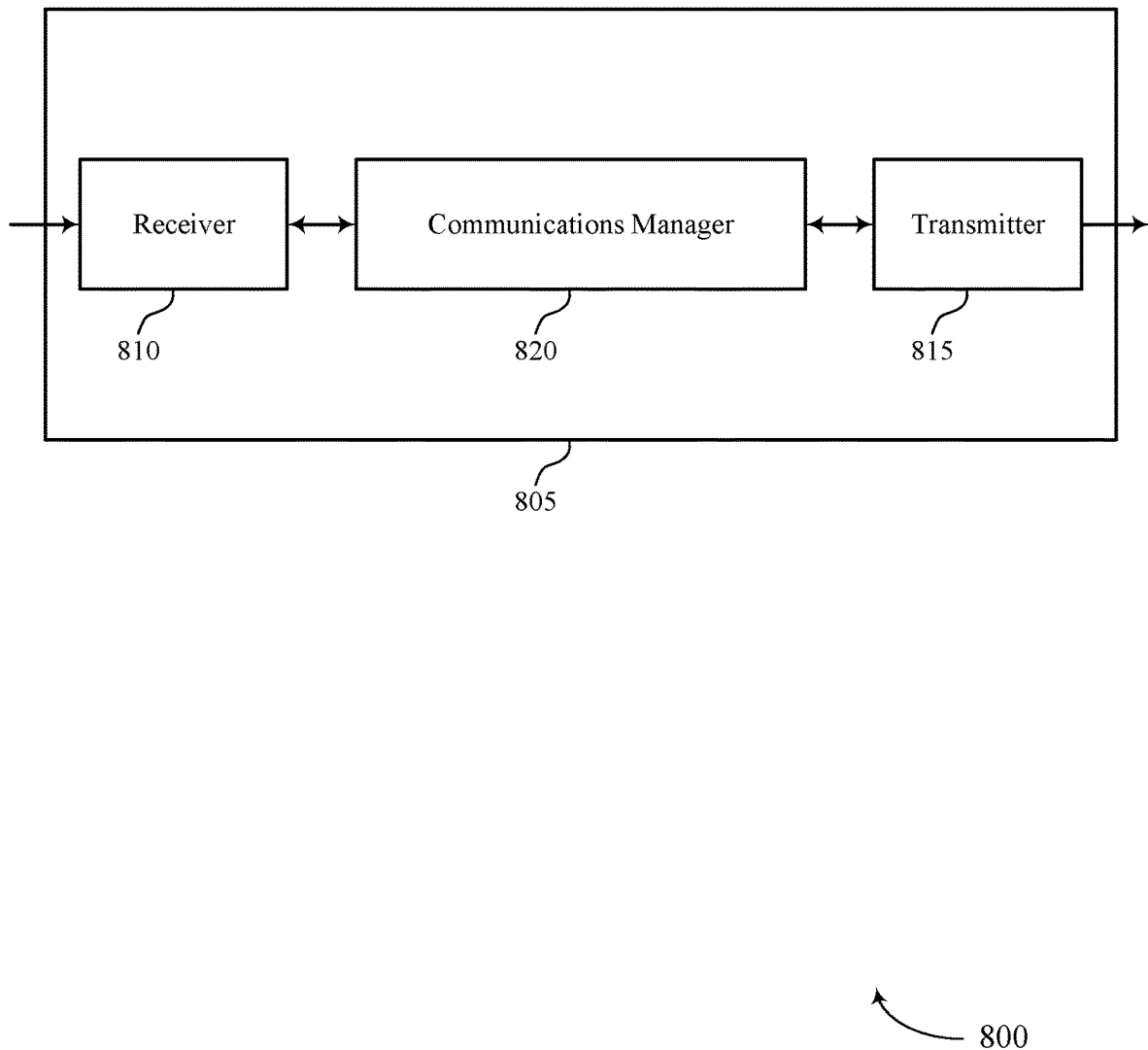
FIGS. 8 and 9 show block diagrams of devices that support data collection enhancements for SCGs in accordance with aspects of the present disclosure.

FIG. 8 shows a block diagram 800 of a device 805 that supports data collection enhancements for SCGs in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to data collection enhancements for SCGs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to data collection enhancements for SCGs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of data collection enhancements for SCGs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for establishing communications with a master node and a secondary node of a wireless communications network, the master node corresponding to an MCG and the secondary node corresponding to an SCG. The communications manager 820 may be configured as or otherwise support a means for collecting data for optimization of the wireless communications network or based on detecting a failure associated with the MCG or the SCG, where the collected data is based on the SCG being in a deactivated state. The communications manager 820 may be configured as or otherwise support a means for transmitting the collected data to a network entity including the secondary node or the master node.

By including or configuring the communications manager 820 in accordance with examples as described herein, the device 805 (e.g., a processor controlling or otherwise coupled to the receiver 810, the transmitter 815, the communications manager 820, or a combination thereof) may support quicker recovery from SCG failure (or other failures) relative to other methods, a wireless communications system may be better optimized (e.g., through machine learning or other techniques based on the reported SCG-related information), or both.

Figure 9:
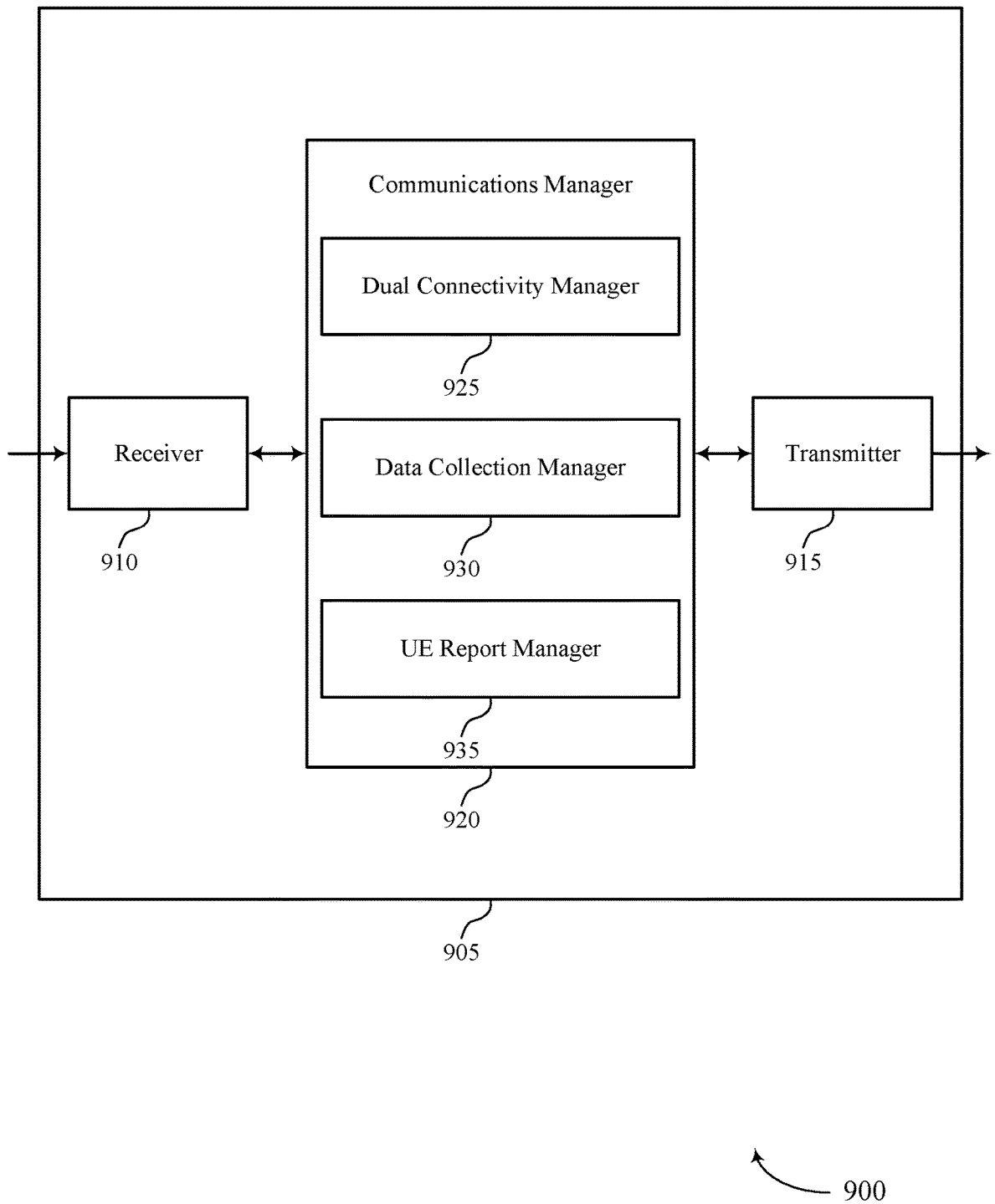

FIG. 9 shows a block diagram 900 of a device 905 that supports data collection enhancements for SCGs in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to data collection enhancements for SCGs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to data collection enhancements for SCGs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of data collection enhancements for SCGs as described herein. For example, the communications manager 920 may include a dual connectivity manager 925, a data collection manager 930, a UE report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The dual connectivity manager 925 may be configured as or otherwise support a means for establishing communications with a master node and a secondary node of a wireless communications network, the master node corresponding to an MCG and the secondary node corresponding to an SCG. The data collection manager 930 may be configured as or otherwise support a means for collecting data for optimization of the wireless communications network or based on detecting a failure associated with the MCG or the SCG, where the collected data is based on the SCG being in a deactivated state. The UE report manager 935 may be configured as or otherwise support a means for transmitting the collected data to a network entity including the secondary node or the master node.

Figure 10:
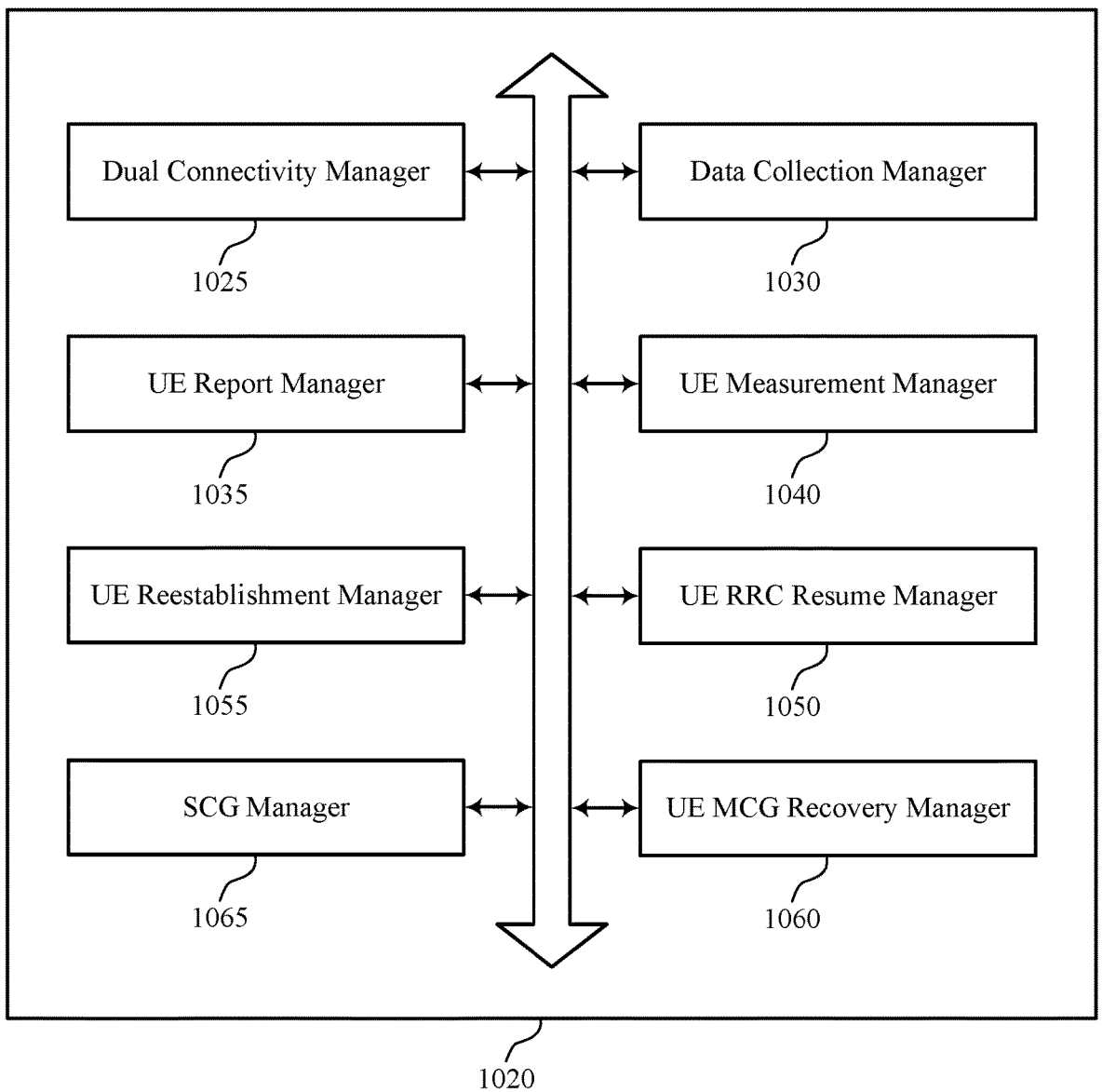
FIG. 10 shows a block diagram of a communications manager that supports data collection enhancements for SCGs in accordance with aspects of the present disclosure.

FIG. 10 shows a block diagram 1000 of a communications manager 1020 that supports data collection enhancements for SCGs in accordance with aspects of the present disclosure. The communications manager 1020 may be an example of aspects of a communications manager 820, a communications manager 920, or both, as described herein. The communications manager 1020, or various components thereof, may be an example of means for performing various aspects of data collection enhancements for SCGs as described herein. For example, the communications manager 1020 may include a dual connectivity manager 1025, a data collection manager 1030, a UE report manager 1035, a UE measurement manager 1040, a UE RRC resume manager 1050, a UE reestablishment manager 1055, a UE MCG recovery manager 1060, an SCG manager 1065, or any combination thereof. Each of these components may communicate, directly or indirectly, with one another (e.g., via one or more buses).

The communications manager 1020 may support wireless communications at a UE in accordance with examples as disclosed herein. The dual connectivity manager 1025 may be configured as or otherwise support a means for establishing communications with a master node and a secondary node of a wireless communications network, the master node corresponding to an MCG and the secondary node corresponding to an SCG. The data collection manager 1030 may be configured as or otherwise support a means for collecting data for optimization of the wireless communications network or based on detecting a failure associated with the MCG or the SCG, where the collected data is based on the SCG being in a deactivated state. The UE report manager 1035 may be configured as or otherwise support a means for transmitting the collected data to a network entity including the secondary node or the master node.

In some examples, the UE measurement manager 1040 may be configured as or otherwise support a means for measuring one or more signals received via the SCG. In some examples, the detected failure is associated with the SCG and is detected while the SCG is in the deactivated state based on measuring the one or more signals received via the SCG. In some examples, the UE report manager 1035 may be configured as or otherwise support a means for transmitting an SCG failure information message including an indication of a failure type corresponding to the detected failure, or an indication of the deactivated state of the SCG, or both.

In some examples, the SCG failure information message further includes a duration between the state of the SCG being the deactivated state and the UE detecting the failure, or a duration between the UE detecting the failure and the UE receiving an RRC reconfiguration message, or both.

In some examples, the failure type includes one of a failure associated with RLM or a failure associated with BFD.

In some examples, the UE RRC resume manager 1050 may be configured as or otherwise support a means for receiving, from the network entity and during a procedure to resume a connected state with the SCG, an indication of whether to change a state of the SCG. In some examples, the UE report manager 1035 may be configured as or otherwise support a means for transmitting, to the network entity, a connection establishment failure report including an indication of the state of the SCG, or one or more radio measurement values associated with the SCG, or both.

In some examples, the SCG manager 1065 may be configured as or otherwise support a means for performing a random access procedure to change the state of the SCG from the deactivated state to an activated state. In some examples, the UE report manager 1035 may be configured as or otherwise support a means for transmitting, to the network entity and after performing the random access procedure, an RA report including an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE or the network entity, or an indication of one or more contention-free random access resources used for the random access procedure, or any combination thereof.

In some examples, the UE reestablishment manager 1055 may be configured as or otherwise support a means for performing a connection reestablishment procedure based on the detected failure. In some examples, the detected failure is associated with a handover procedure to switch from the master node to a second master node corresponding to a second MCG, and where the SCG is in the deactivated state at a time of the detected failure. In some examples, the UE report manager 1035 may be configured as or otherwise support a means for transmitting, after performing the connection reestablishment procedure, an RLF including an SCG failure information message that includes an indication of a failure type corresponding to the detected failure, or an indication of the deactivated state of the SCG, or both, an indication of the detected failure, an indication of the deactivated state of the SCG, an indication of one or more RLM measurement values associated with the SCG, or an indication of one or more RRM measurement values associated with the SCG, or any combination thereof.

In some examples, the UE MCG recovery manager 1060 may be configured as or otherwise support a means for attempting to perform an MCG recovery procedure based on a failure associated with the MCG, where the detected failure is associated with the SCG and occurs during the MCG recovery procedure. In some examples, the UE reestablishment manager 1055 may be configured as or otherwise support a means for performing a connection reestablishment procedure based on the MCG recovery procedure failing, where transmitting the collected data includes transmitting, after performing the connection reestablishment procedure, an RLF report including an SCG failure information message that includes an indication of a failure type corresponding to the detected failure, or an indication of the deactivated state of the SCG, or both.

In some examples, the UE MCG recovery manager 1060 may be configured as or otherwise support a means for attempting to perform an MCG recovery procedure based on the detected failure, where the detected failure is associated with the MCG. In some examples, the SCG manager 1065 may be configured as or otherwise support a means for identifying that one or more measurement values associated with the SCG are degrading while attempting to perform the MCG recovery procedure, where transmitting the collected data includes transmitting, based on the detected failure, a MCG failure information message including an indication of one or more RLM measurement values associated with the MCG, or an indication of one or more RLM measurement values associated with the SCG, or both.

In some examples, the UE report manager 1035 may be configured as or otherwise support a means for transmitting, to the network entity, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

In some examples, the UE report manager 1035 may be configured as or otherwise support a means for transmitting, to the network entity, an immediate MDT report including one or more measurement values associated with the SCG and an indication of a corresponding state of the SCG for the one or more measurement values.

In some examples, the UE report manager 1035 may be configured as or otherwise support a means for transmitting, to the network entity, a logged MDT report including an indication of the state of the SCG, or whether dual connectivity is configured at the UE, or both.

Figure 11:
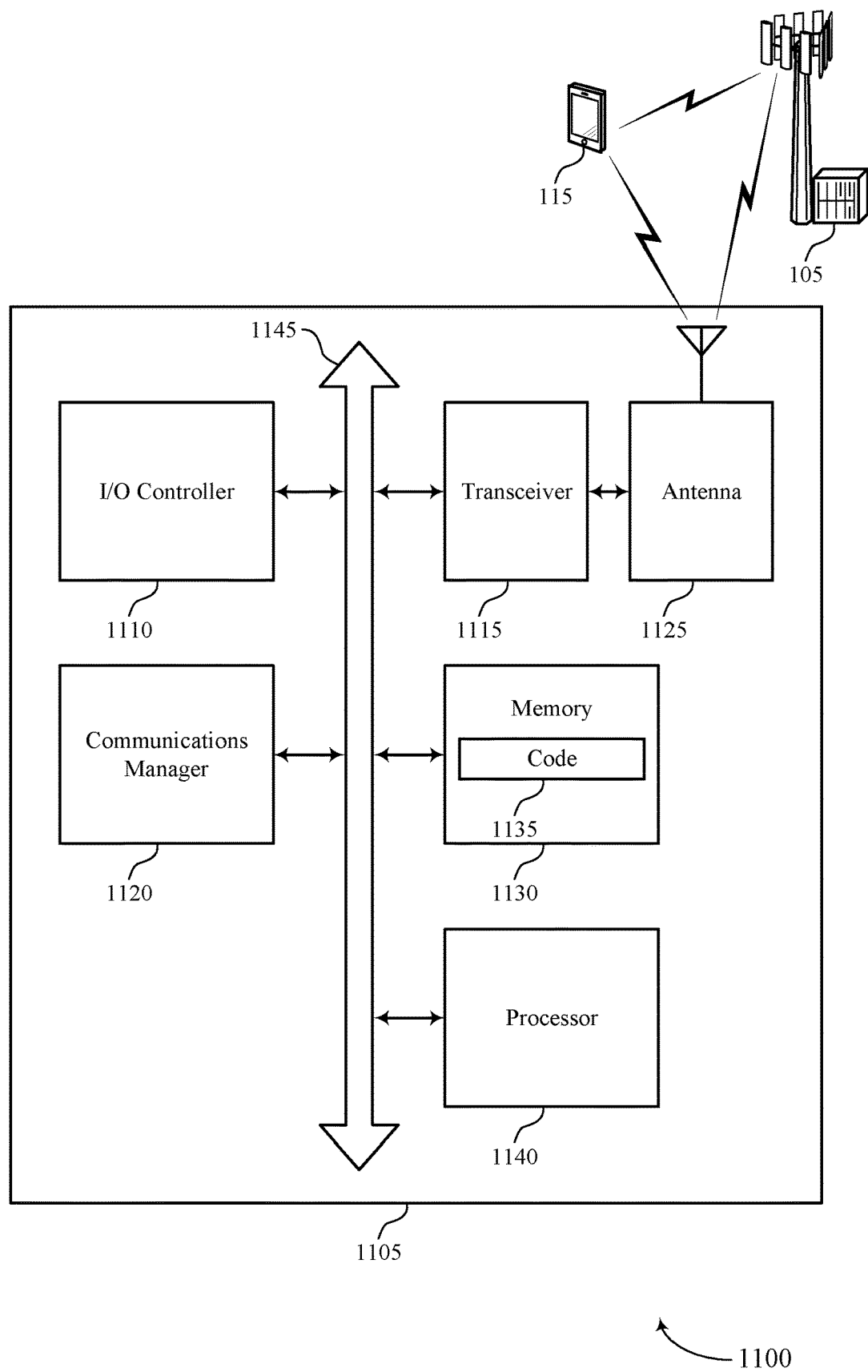
FIG. 11 shows a diagram of a system including a device that supports data collection enhancements for SCGs in accordance with aspects of the present disclosure.

FIG. 11 shows a diagram of a system 1100 including a device 1105 that supports data collection enhancements for SCGs in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting data collection enhancements for SCGs). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for establishing communications with a master node and a secondary node of a wireless communications network, the master node corresponding to an MCG and the secondary node corresponding to an SCG. The communications manager 1120 may be configured as or otherwise support a means for collecting data for optimization of the wireless communications network or based on detecting a failure associated with the MCG or the SCG, where the collected data is based on the SCG being in a deactivated state. The communications manager 1120 may be configured as or otherwise support a means for transmitting the collected data to a network entity including the secondary node or the master node.

By including or configuring the communications manager 1120 in accordance with examples as described herein, the device 1105 may support techniques for reduced latency in recovering from an SCG failure while the SCG is in a deactivated state, for improved optimization of a wireless communications system may be better optimized (e.g., through machine learning or other techniques based on the reported SCG-related information), or both.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of data collection enhancements for SCGs as described herein, or the processor 1140 and the memory 1130 may be otherwise configured to perform or support such operations.

Figure 12:
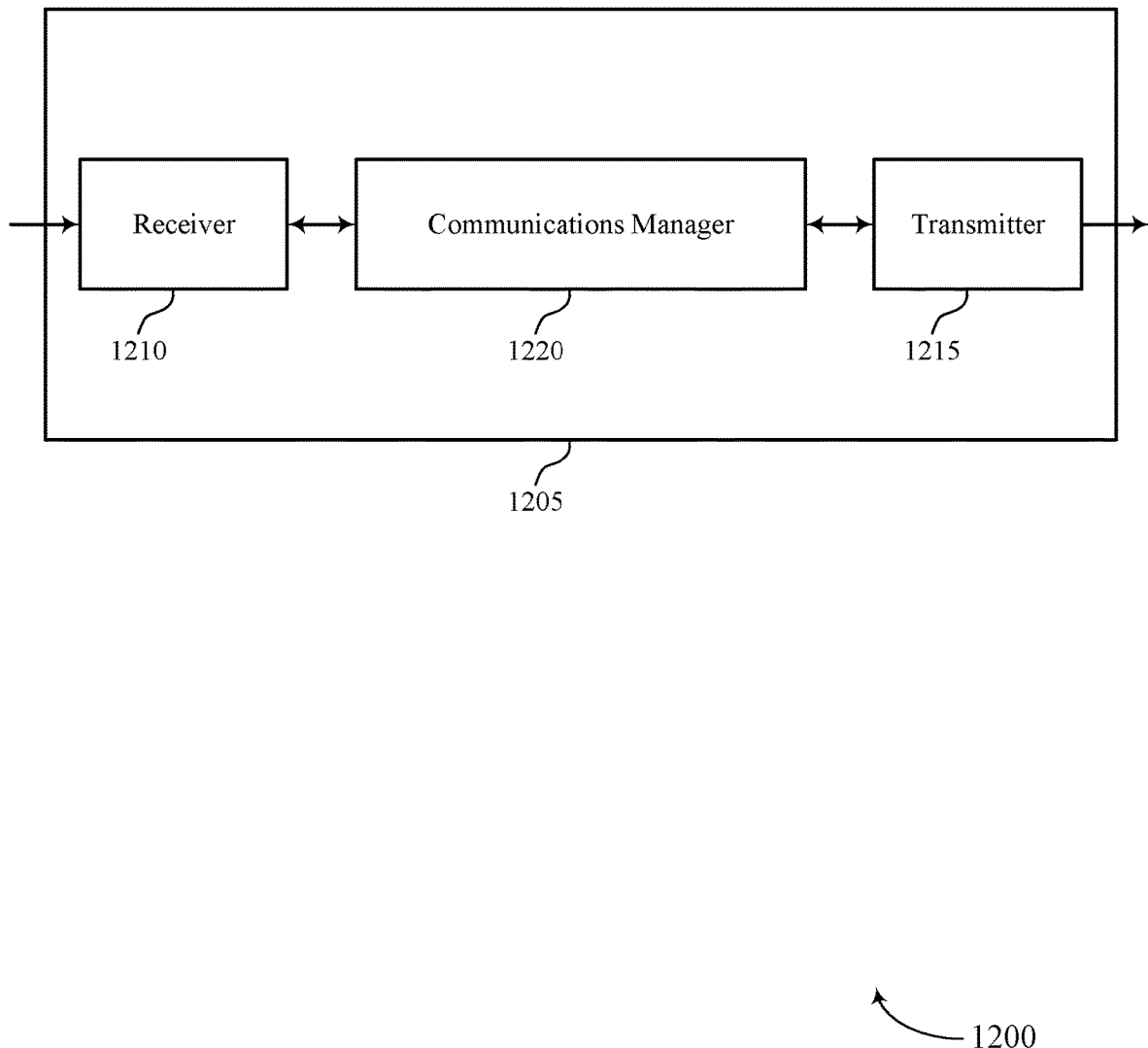
FIGS. 12 and 13 show block diagrams of devices that support data collection enhancements for SCGs in accordance with aspects of the present disclosure.

FIG. 12 shows a block diagram 1200 of a device 1205 that supports data collection enhancements for SCGs in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to data collection enhancements for SCGs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to data collection enhancements for SCGs). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of data collection enhancements for SCGs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a master node corresponding to an MCG within a wireless communications network in accordance with examples as disclosed herein. For example, the communications manager 1220 may be configured as or otherwise support a means for establishing communications with a UE. The communications manager 1220 may be configured as or otherwise support a means for receiving data for optimization of the wireless communications network or based on a failure associated with the MCG or an SCG corresponding to a secondary node, where the collected data is based on the SCG being in a deactivated state.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support quicker recovery from SCG failure (or other failures) relative to other methods, a wireless communications system may be better optimized (e.g., through machine learning or other techniques based on the reported SCG-related information), or both.

Figure 13:
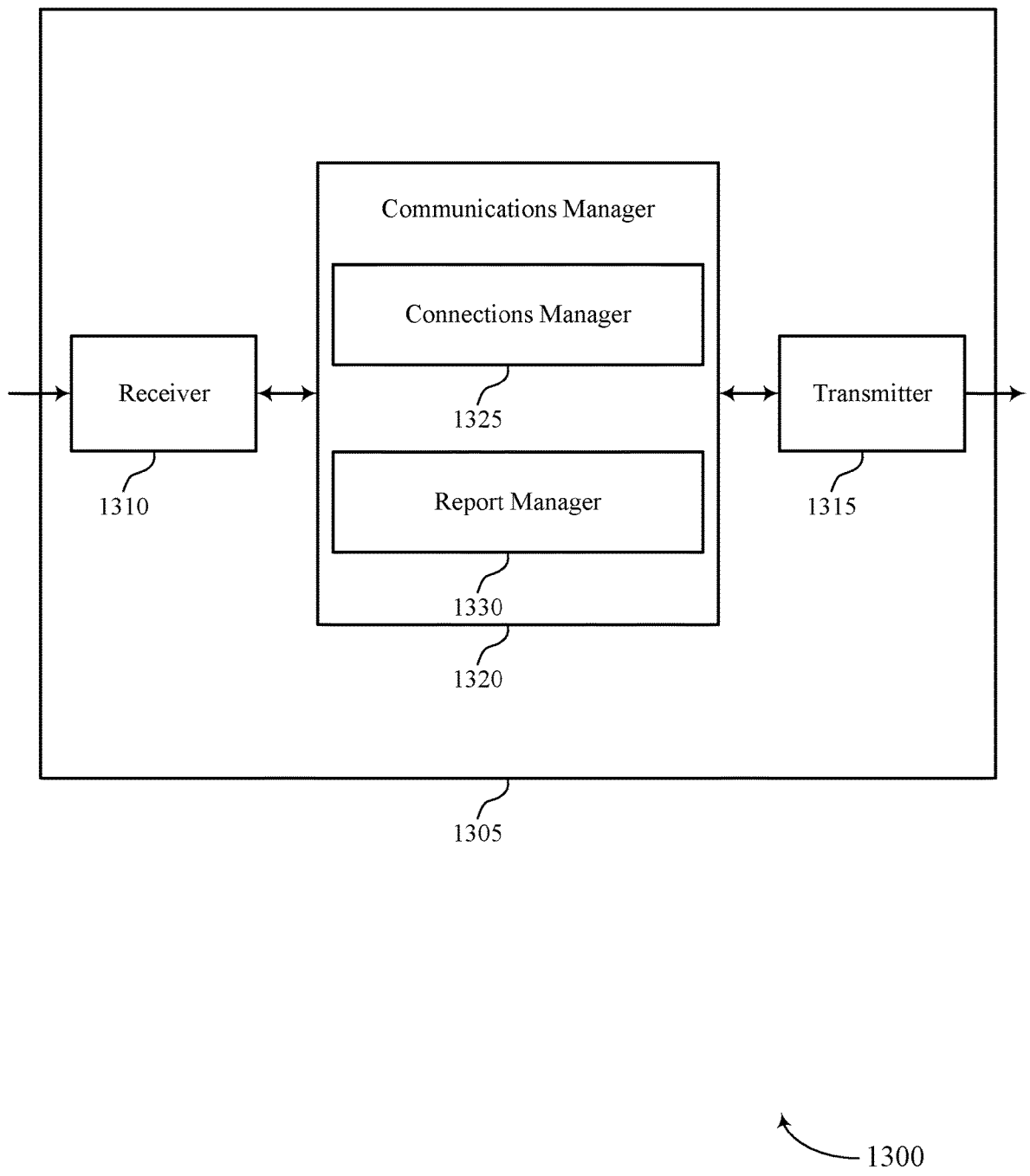

FIG. 13 shows a block diagram 1300 of a device 1305 that supports data collection enhancements for SCGs in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to data collection enhancements for SCGs). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to data collection enhancements for SCGs). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of data collection enhancements for SCGs as described herein. For example, the communications manager 1320 may include a connections manager 1325 a report manager 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a master node corresponding to an MCG within a wireless communications network in accordance with examples as disclosed herein. The connections manager 1325 may be configured as or otherwise support a means for establishing communications with a UE. The report manager 1330 may be configured as or otherwise support a means for receiving data for optimization of the wireless communications network or based on a failure associated with the MCG or an SCG corresponding to a secondary node, where the collected data is based on the SCG being in a deactivated state.

Figure 14:
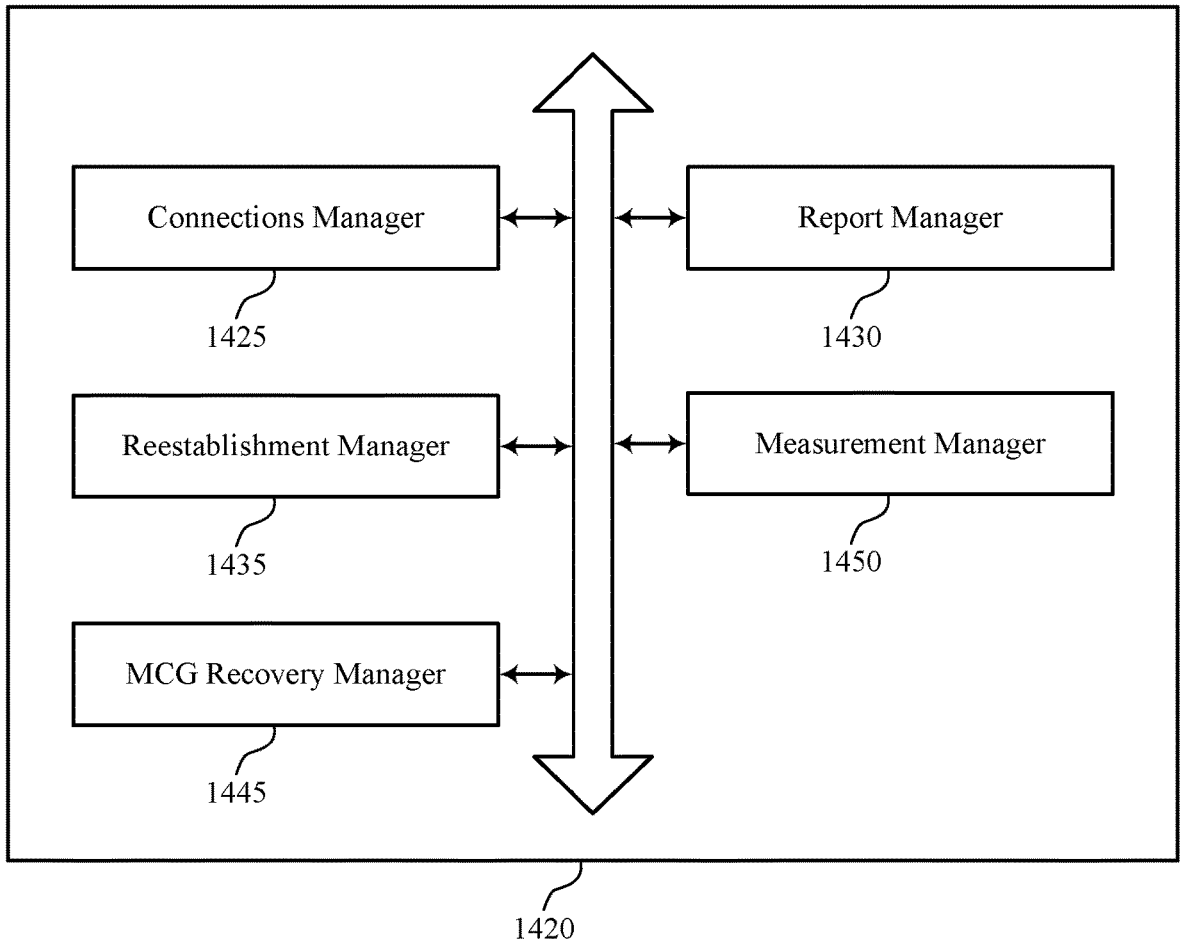
FIG. 14 shows a block diagram of a communications manager that supports data collection enhancements for SCGs in accordance with aspects of the present disclosure.

FIG. 14 shows a block diagram 1400 of a communications manager 1420 that supports data collection enhancements for SCGs in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of data collection enhancements for SCGs as described herein. For example, the communications manager 1420 may include a connections manager 1425, a report manager 1430, a reestablishment manager 1435, an MCG recovery manager 1445, a measurement manager 1450, or any combination thereof. Each of these components may communicate, directly or indirectly, with one another (e.g., via one or more buses).

The communications manager 1420 may support wireless communications at a master node corresponding to a MCG within a wireless communications network in accordance with examples as disclosed herein. The connections manager 1425 may be configured as or otherwise support a means for establishing communications with a UE. The report manager 1430 may be configured as or otherwise support a means for receiving data for optimization of the wireless communications network or based on a failure associated with the MCG or an SCG corresponding to a secondary node, where the collected data is based on the SCG being in a deactivated state.

In some examples, to support receiving the data, the report manager 1430 may be configured as or otherwise support a means for receiving an SCG failure information message from the UE based on the failure, where the failure is associated with the SCG, and where the SCG failure information message includes an indication of a failure type corresponding to the failure, or an indication of the deactivated state of the SCG, or both.

In some examples, the SCG failure information message further includes a duration between the state of the SCG being the deactivated state and the UE detecting the failure, or a duration between the UE detecting the failure and the UE receiving an RRC reconfiguration message, or both.

In some examples, the failure type includes one of a failure associated with RLM or a failure associated with BFD.

In some examples, the report manager 1430 may be configured as or otherwise support a means for receiving, from the UE and based on a procedure for the UE to resume a connection with the SCG, a CEF report including an indication of the state of the SCG, or one or more radio measurement values associated with the SCG, or both.

In some examples, the report manager 1430 may be configured as or otherwise support a means for receiving, from the UE and based on a random access procedure for the UE to change the state of the SCG from the deactivated state to an activated state, an RA report including an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE, the secondary node, or the master node, an indication of one or more contention-free random access resources used for the random access procedure, or any combination thereof.

In some examples, the reestablishment manager 1435 may be configured as or otherwise support a means for performing a connection reestablishment procedure with the UE based on the failure. In some examples, the failure is associated with a handover procedure for the UE to switch from the master node to a second master node corresponding to a second MCG, and where the SCG is in the deactivated state at a time of the failure. In some examples, the report manager 1430 may be configured as or otherwise support a means for receiving the data includes receiving, after performing the connection reestablishment procedure, an RLF report including an SCG failure information message that includes an indication of a failure type corresponding to the failure, or an indication of the deactivated state of the SCG, or both, an indication of the failure, an indication of the deactivated state of the SCG, an indication of one or more RLM measurement values associated with the SCG, or an indication of one or more RRM measurement values associated with the SCG, or any combination thereof.

In some examples, the MCG recovery manager 1445 may be configured as or otherwise support a means for attempting to perform an MCG recovery procedure with the UE based on a failure associated with the MCG, where the failure is associated with the SCG and occurs during the MCG recovery procedure. In some examples, the reestablishment manager 1435 may be configured as or otherwise support a means for performing a connection reestablishment procedure with the UE based on the MCG recovery procedure failing, where receiving the data includes receiving, after performing the connection reestablishment procedure, an RLF report including an SCG failure information message that includes an indication of a failure type corresponding to the failure, or an indication of the deactivated state of the SCG, or both.

In some examples, the MCG recovery manager 1445 may be configured as or otherwise support a means for attempting to perform a MCG recovery procedure based on the failure, where the failure is associated with the MCG, and where receiving the data includes receiving, based on the failure, a MCG failure information message including an indication of one or more RLM measurement values associated with the MCG, or an indication of one or more RLM measurement values associated with the SCG, or both.

In some examples, the report manager 1430 may be configured as or otherwise support a means for receiving, from the UE, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

In some examples, the report manager 1430 may be configured as or otherwise support a means for receiving, from the UE, an immediate MDT report including one or more measurement values associated with the SCG and an indication of a corresponding state of the SCG.

In some examples, the report manager 1430 may be configured as or otherwise support a means for receiving, from the UE, a logged MDT report including an indication of the state of the SCG, or whether dual connectivity is configured at the UE, or both.

In some examples, the measurement manager 1450 may be configured as or otherwise support a means for measuring a rate at which SCG activation was requested by a network entity or the UE, a number of successful SCG activations or deactivations, a number of times random access was performed for SCG activation, a number of failed SCG activations or deactivations, an SCG activation delay, an SCG deactivation delay, a duration between consecutive SCG activation or deactivations, or a set of triggers for secondary cell activation or deactivation, or any combination thereof.

Figure 15:
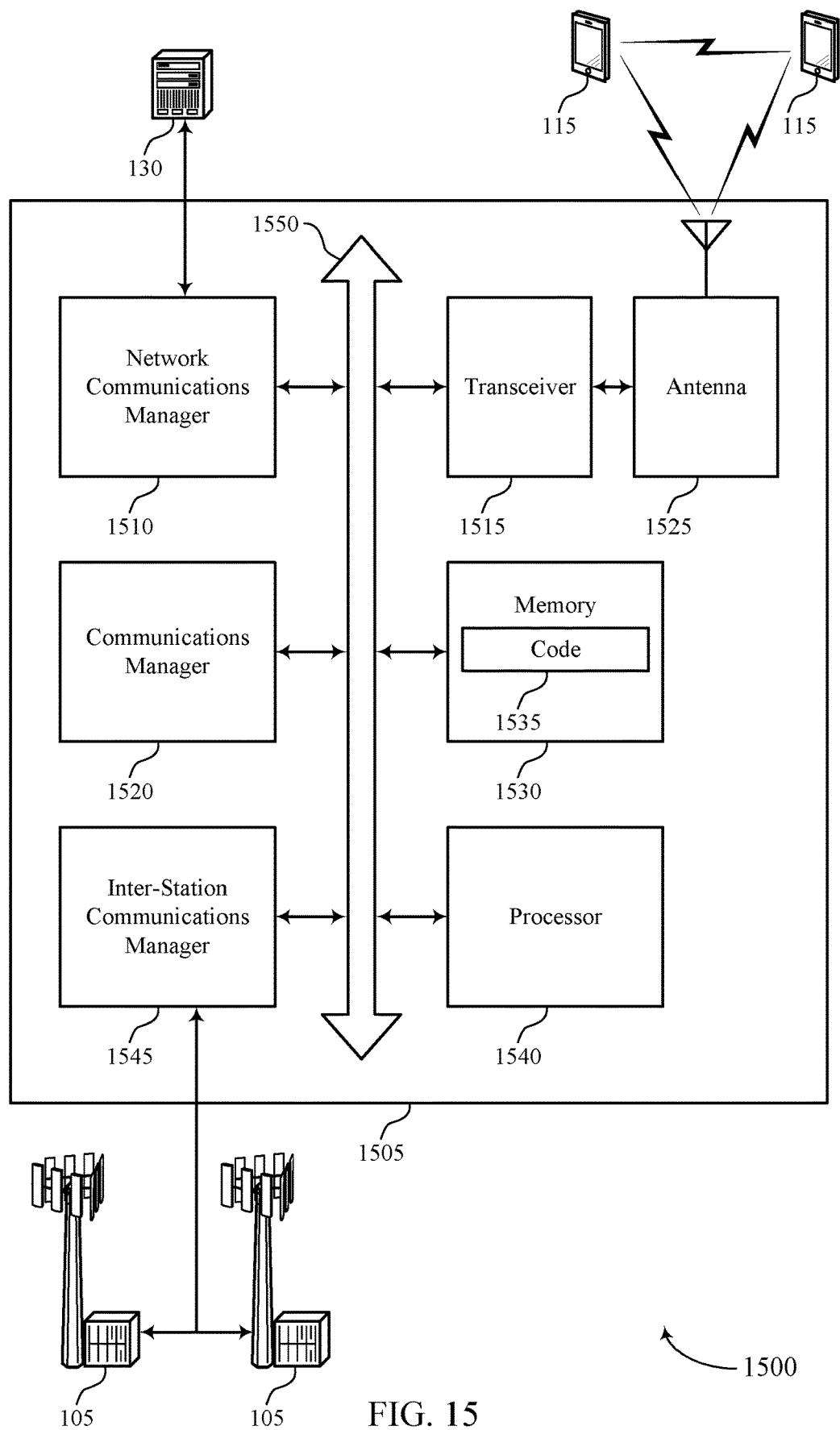
FIG. 15 shows a diagram of a system including a device that supports data collection enhancements for SCGs in accordance with aspects of the present disclosure.

FIG. 15 shows a diagram of a system 1500 including a device 1505 that supports data collection enhancements for SCGs in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting data collection enhancements for SCGs). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a master node corresponding to a MCG within a wireless communications network in accordance with examples as disclosed herein. For example, the communications manager 1520 may be configured as or otherwise support a means for establishing communications with a UE. The communications manager 1520 may be configured as or otherwise support a means for receiving data for optimization of the wireless communications network or based on a failure associated with the MCG or an SCG corresponding to a secondary node, where the collected data is based on the SCG being in a deactivated state.

By including or configuring the communications manager 1520 in accordance with examples as described herein, the device 1505 may support techniques for reduced latency in recovering from an SCG failure while the SCG is in a deactivated state, for improved optimization of a wireless communications system may be better optimized (e.g., through machine learning or other techniques based on the reported SCG-related information), or both.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of data collection enhancements for SCGs as described herein, or the processor 1540 and the memory 1530 may be otherwise configured to perform or support such operations.

Figure 16:
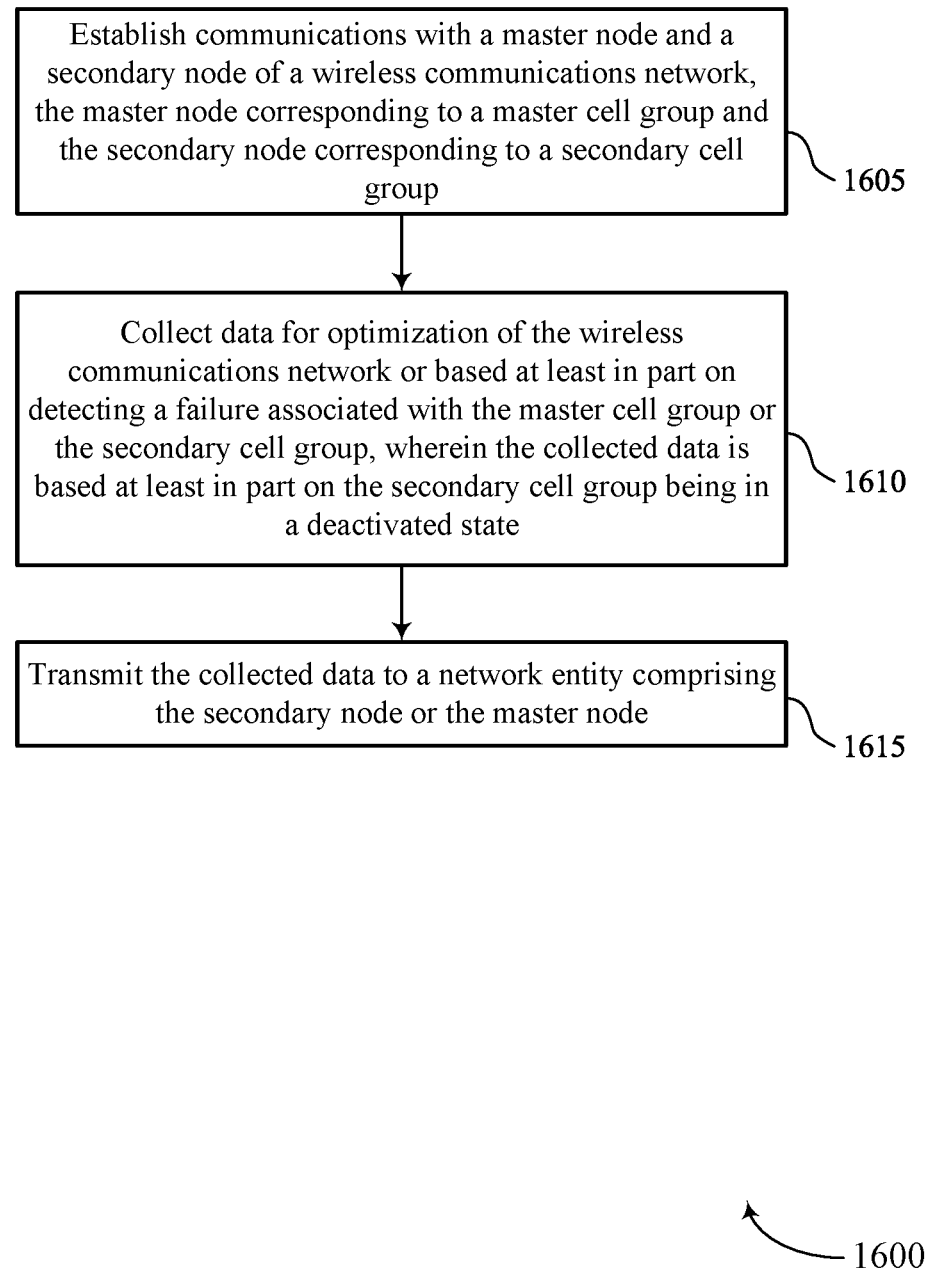
FIGS. 16 through 19 show flowcharts illustrating methods that support data collection enhancements for SCGs in accordance with aspects of the present disclosure.

FIG. 16 shows a flowchart illustrating a method 1600 that supports data collection enhancements for SCGs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include establishing communications with a master node and a secondary node of a wireless communications network, the master node corresponding to a MCG and the secondary node corresponding to an SCG. The operations of 1605 may be performed in accordance with examples as disclosed herein. In some examples, aspects of the operations of 1605 may be performed by a dual connectivity manager 1025 as described with reference to FIG. 10.

At 1610, the method may include collecting data for optimization of the wireless communications network or based on detecting a failure associated with the MCG or the SCG, where the collected data is based on the SCG being in a deactivated state. The operations of 1610 may be performed in accordance with examples as disclosed herein. In some examples, aspects of the operations of 1610 may be performed by a data collection manager 1030 as described with reference to FIG. 10.

At 1615, the method may include transmitting the collected data to a network entity including the secondary node or the master node. The operations of 1615 may be performed in accordance with examples as disclosed herein. In some examples, aspects of the operations of 1615 may be performed by a UE report manager 1035 as described with reference to FIG. 10.

Figure 17:
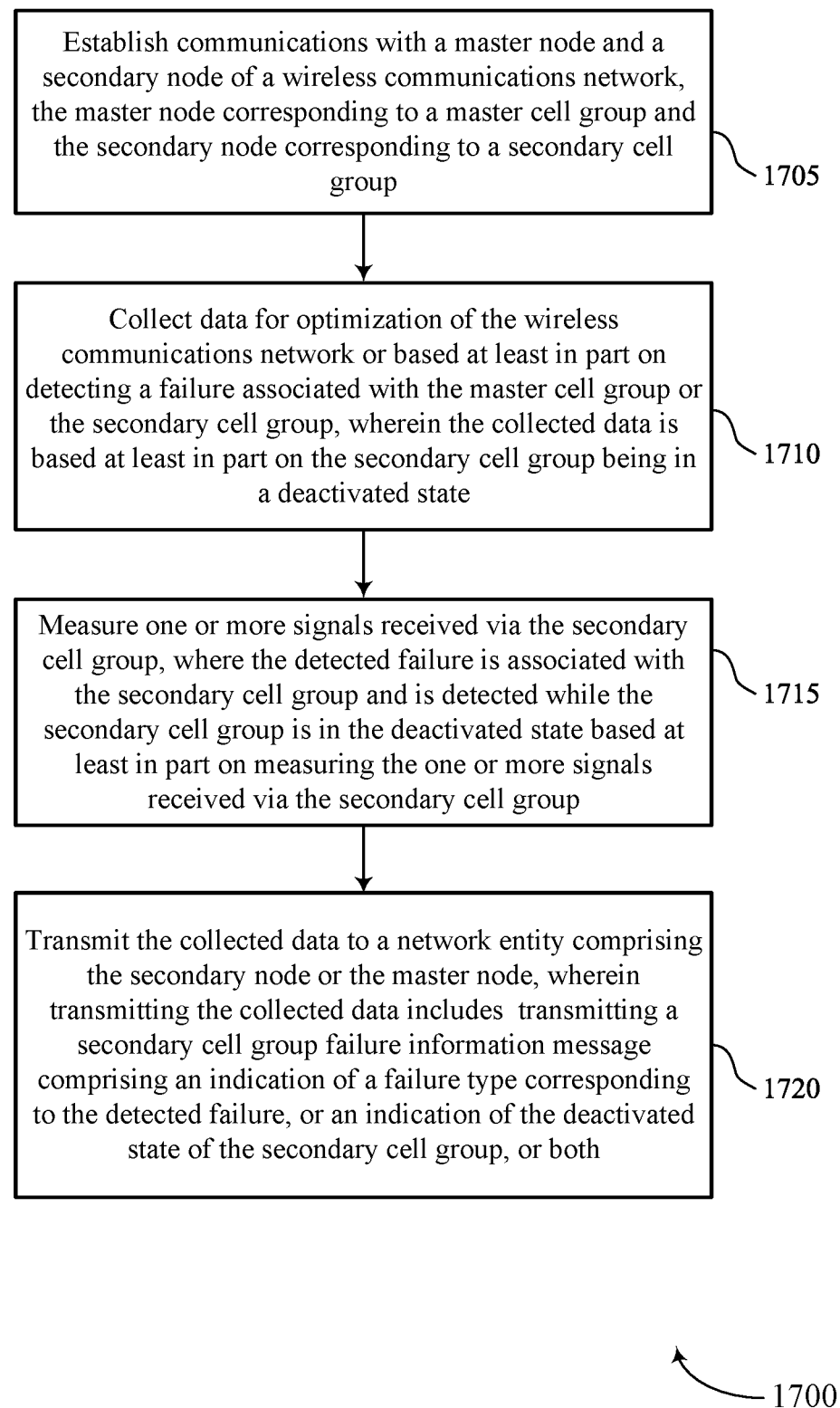

FIG. 17 shows a flowchart illustrating a method 1700 that supports data collection enhancements for SCGs in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include establishing communications with a master node and a secondary node of a wireless communications network, the master node corresponding to a MCG and the secondary node corresponding to an SCG. The operations of 1705 may be performed in accordance with examples as disclosed herein. In some examples, aspects of the operations of 1705 may be performed by a dual connectivity manager 1025 as described with reference to FIG. 10.

At 1710, the method may include collecting data for optimization of the wireless communications network or based on detecting a failure associated with the MCG or the SCG, where the collected data is based on the SCG being in a deactivated state. The operations of 1710 may be performed in accordance with examples as disclosed herein. In some examples, aspects of the operations of 1710 may be performed by a data collection manager 1030 as described with reference to FIG. 10.

At 1715, the method may include measuring one or more signals received via the SCG, where the detected failure is associated with the SCG and is detected while the SCG is in the deactivated state based on measuring the one or more signals received via the SCG. The operations of 1715 may be performed in accordance with examples as disclosed herein. In some examples, aspects of the operations of 1715 may be performed by a UE measurement manager 1040 as described with reference to FIG. 10.

At 1720, the method may include transmitting the collected data to a network entity including the secondary node or the master node, where transmitting the collected data includes transmitting an SCG failure information message including an indication of a failure type corresponding to the detected failure, or an indication of the deactivated state of the SCG, or both. The operations of 1720 may be performed in accordance with examples as disclosed herein. In some examples, aspects of the operations of 1720 may be performed by a UE report manager 1035 as described with reference to FIG. 10.

Figure 18:
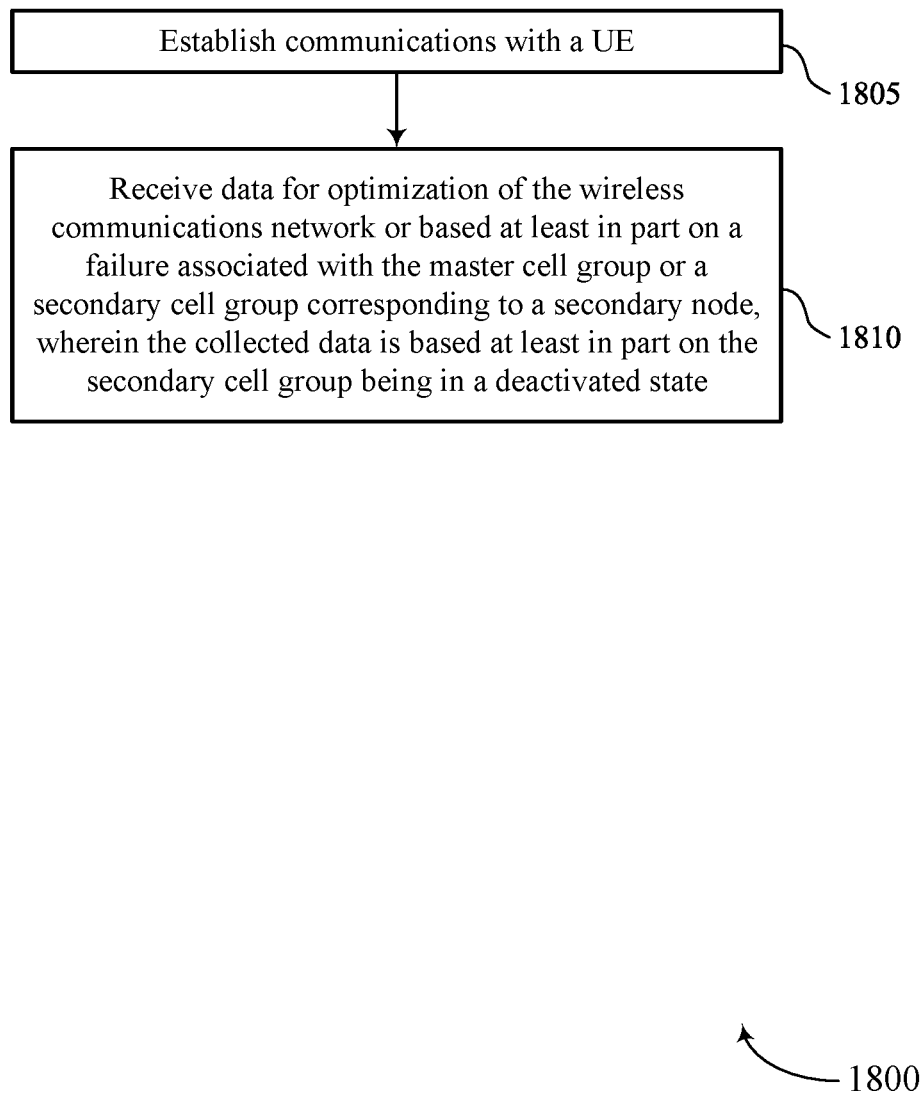

FIG. 18 shows a flowchart illustrating a method 1800 that supports data collection enhancements for SCGs in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include establishing communications with a UE. The operations of 1805 may be performed in accordance with examples as disclosed herein. In some examples, aspects of the operations of 1805 may be performed by a connections manager 1425 as described with reference to FIG. 14.

At 1810, the method may include receiving data for optimization of the wireless communications network or based on a failure associated with the MCG or an SCG corresponding to a secondary node, where the collected data is based on the SCG being in a deactivated state. The operations of 1810 may be performed in accordance with examples as disclosed herein. In some examples, aspects of the operations of 1810 may be performed by a report manager 1430 as described with reference to FIG. 14.

Figure 19:
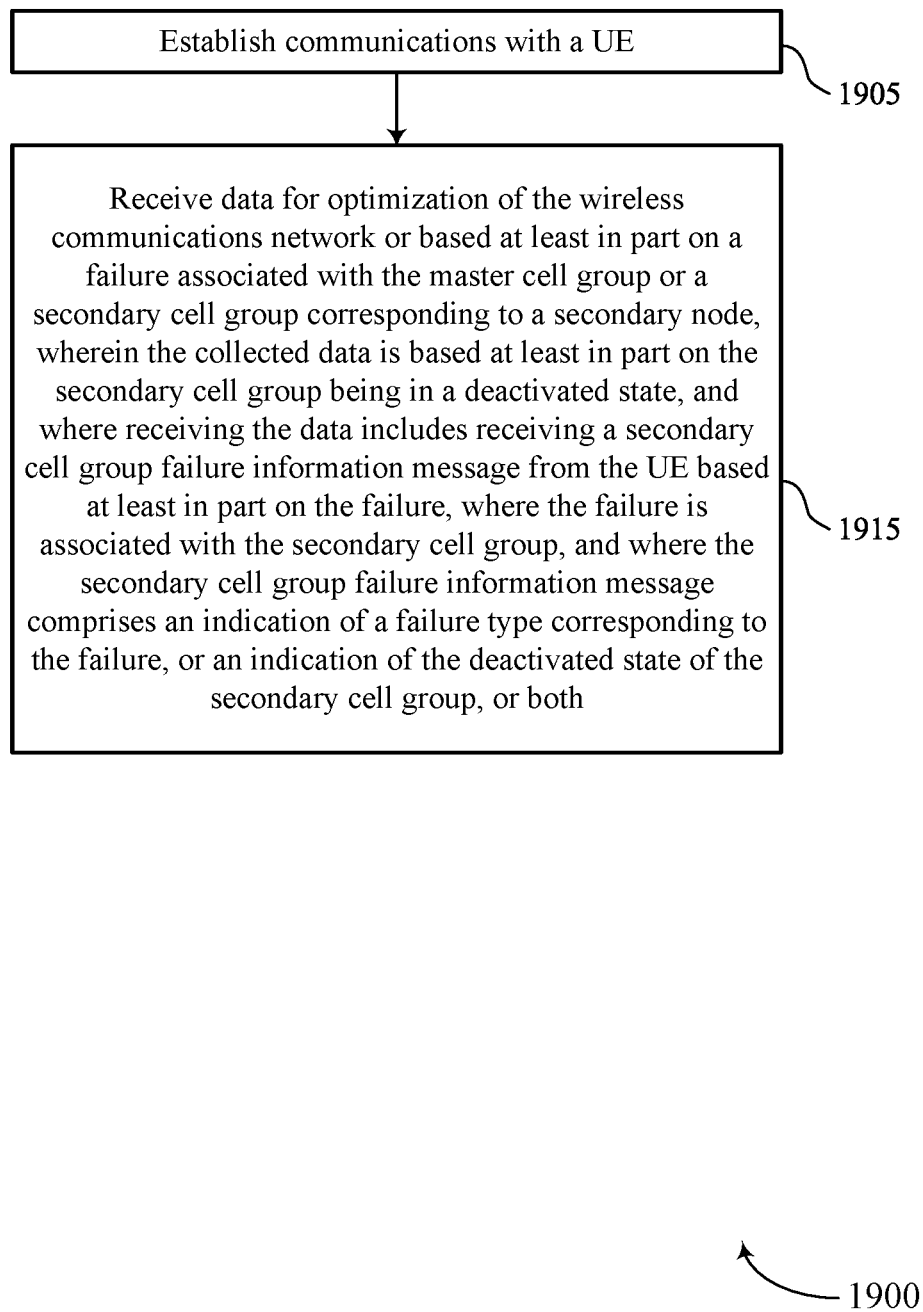

FIG. 19 shows a flowchart illustrating a method 1900 that supports data collection enhancements for SCGs in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include establishing communications with a UE. The operations of 1905 may be performed in accordance with examples as disclosed herein. In some examples, aspects of the operations of 1905 may be performed by a connections manager 1425 as described with reference to FIG. 14.

At 1910, the method may include receiving data for optimization of the wireless communications network or based on a failure associated with the MCG or an SCG corresponding to a secondary node, where the collected data is based on the SCG being in a deactivated state, and where receiving an SCG failure information message from the UE based on the failure, where the failure is associated with the SCG, and where the SCG failure information message includes an indication of a failure type corresponding to the failure, or an indication of the deactivated state of the SCG, or both. The operations of 1910 may be performed in accordance with examples as disclosed herein. In some examples, aspects of the operations of 1910 may be performed by a report manager 1430 as described with reference to FIG. 14.

The following provides an overview of aspects of the present disclosure:

Aspect 1: A method for wireless communications at a UE, comprising: establishing communications with a master node and a secondary node of a wireless communications network, the master node corresponding to an MCG and the secondary node corresponding to an SCG; collecting data for optimization of the wireless communications network or based at least in part on detecting a failure associated with the MCG or the SCG, wherein the collected data is based at least in part on the SCG being in a deactivated state; and transmitting the collected data to a network entity comprising the secondary node or the master node.

Aspect 2: The method of aspect 1, wherein measuring one or more signals received via the SCG, wherein: the detected failure is associated with the SCG and is detected while the SCG is in the deactivated state based at least in part on measuring the one or more signals received via the SCG; and transmitting the collected data comprises transmitting an SCG failure information message comprising an indication of a failure type corresponding to the detected failure, or an indication of the deactivated state of the SCG, or both.

Aspect 3: The method of aspect 2, wherein the SCG failure information message further comprises a duration between the state of the SCG being the deactivated state and the UE detecting the failure, or a duration between the UE detecting the failure and the UE receiving a RRC reconfiguration message, or both.

Aspect 4: The method of any of aspects 2 through 3, wherein the failure type comprises one of a failure associated with RLM or a failure associated with BFD.

Aspect 5: The method of any of aspects 1 through 4, further comprising: receiving, from the network entity and during a procedure to resume a connected state with the SCG, an indication of whether to change a state of the SCG; and transmitting, to the network entity, a CEF report comprising an indication of the state of the SCG, or one or more radio measurement values associated with the SCG, or both.

Aspect 6: The method of aspect 5, further comprising: performing a random access procedure to change the state of the SCG from the deactivated state to an activated state; and transmitting, to the network entity and after performing the random access procedure, an RA report comprising an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE or the network entity, or an indication of one or more contention-free random access resources used for the random access procedure, or any combination thereof.

Aspect 7: The method of any of aspects 1 through 6, further comprising: performing a connection reestablishment procedure based at least in part on the detected failure, wherein: the detected failure is associated with a handover procedure to switch from the master node to a second master node corresponding to a second MCG, and wherein the SCG is in the deactivated state at a time of the detected failure; and transmitting the collected data comprises transmitting, after performing the connection reestablishment procedure, an RLF report comprising an SCG failure information message that comprises an indication of a failure type corresponding to the detected failure, or an indication of the deactivated state of the SCG, or both, an indication of the detected failure, an indication of the deactivated state of the SCG, an indication of one or more RLM measurement values associated with the SCG, or an indication of one or more RRM measurement values associated with the SCG, or any combination thereof.

Aspect 8: The method of any of aspects 1 through 7, further comprising: attempting to perform an MCG recovery procedure based at least in part on a failure associated with the MCG, wherein the detected failure is associated with the SCG and occurs during the MCG recovery procedure; and performing a connection reestablishment procedure based at least in part on the MCG recovery procedure failing, wherein transmitting the collected data comprises transmitting, after performing the connection reestablishment procedure, an RLF report comprising an SCG failure information message that comprises an indication of a failure type corresponding to the detected failure, or an indication of the deactivated state of the SCG, or both.

Aspect 9: The method of any of aspects 1 through 8, further comprising: attempting to perform an MCG recovery procedure based at least in part on the detected failure, wherein the detected failure is associated with the MCG; and identifying that one or more measurement values associated with the SCG are degrading while attempting to perform the MCG recovery procedure, wherein transmitting the collected data comprises transmitting, based at least in part on the detected failure, an MCG failure information message comprising an indication of one or more RLM measurement values associated with the MCG, or an indication of one or more RLM measurement values associated with the SCG, or both.

Aspect 10: The method of any of aspects 1 through 9, further comprising: transmitting, to the network entity, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

Aspect 11: The method of any of aspects 1 through 10, further comprising: transmitting, to the network entity, an intermediate MDT report comprising one or more measurement values associated with the SCG and an indication of a corresponding state of the SCG for the one or more measurement values.

Aspect 12: The method of any of aspects 1 through 11, further comprising: transmitting, to the network entity, a logged MDT report comprising an indication of the state of the SCG, or whether dual connectivity is configured at the UE, or both.

Aspect 13: A method for wireless communications at a master node corresponding to an MCG within a wireless communications network, comprising: establishing communications with a UE; and receiving data for optimization of the wireless communications network or based at least in part on a failure associated with the MCG or an SCG corresponding to a secondary node, wherein the collected data is based at least in part on the SCG being in a deactivated state.

Aspect 14: The method of aspect 13, wherein receiving the data comprises: receiving an SCG failure information message from the UE based at least in part on the failure, wherein the failure is associated with the SCG, and wherein the SCG failure information message comprises an indication of a failure type corresponding to the failure, or an indication of the deactivated state of the SCG, or both.

Aspect 15: The method of aspect 14, wherein the SCG failure information message further comprises a duration between the state of the SCG being the deactivated state and the UE detecting the failure, or a duration between the UE detecting the failure and the UE receiving a RRC reconfiguration message, or both.

Aspect 16: The method of any of aspects 14 through 15, wherein the failure type comprises one of a failure associated with RLM or a failure associated with BFD.

Aspect 17: The method of any of aspects 13 through 16, further comprising: receiving, from the UE and based at least in part on a procedure for the UE to resume a connection with the SCG, a CEF report comprising an indication of the state of the SCG, or one or more radio measurement values associated with the SCG, or both.

Aspect 18: The method of any of aspects 13 through 17, further comprising: receiving, from the UE and based at least in part on a random access procedure for the UE to change the state of the SCG from the deactivated state to an activated state, an RA report comprising an indication that the random access procedure was performed in a primary secondary cell to change the state of the SCG from the deactivated state to the activated state, an indication of whether an expiration of a timing advance timer occurred during the random access procedure, an indication of one or more beam indices used during the random access procedure, an indication of whether the random access procedure was initiated by the UE, the secondary node, or the master node, an indication of one or more contention-free random access resources used for the random access procedure, or any combination thereof.

Aspect 19: The method of any of aspects 13 through 18, further comprising: performing a connection reestablishment procedure with the UE based at least in part on the failure, wherein: the failure is associated with a handover procedure for the UE to switch from the master node to a second master node corresponding to a second MCG, and wherein the SCG is in the deactivated state at a time of the failure; and receiving the data comprises receiving, after performing the connection reestablishment procedure, an RLF report comprising an SCG failure information message that comprises an indication of a failure type corresponding to the failure, or an indication of the deactivated state of the SCG, or both, an indication of the failure, an indication of the deactivated state of the SCG, an indication of one or more RLM measurement values associated with the SCG, or an indication of one or more RRM measurement values associated with the SCG, or any combination thereof.

Aspect 20: The method of any of aspects 13 through 19, further comprising: attempting to perform an MCG recovery procedure with the UE based at least in part on a failure associated with the MCG, wherein the failure is associated with the SCG and occurs during the MCG recovery procedure; and performing a connection reestablishment procedure with the UE based at least in part on the MCG recovery procedure failing, wherein receiving the data comprises receiving, after performing the connection reestablishment procedure, an RLF report comprising an SCG failure information message that comprises an indication of a failure type corresponding to the failure, or an indication of the deactivated state of the SCG, or both.

Aspect 21: The method of any of aspects 13 through 20, further comprising: attempting to perform an MCG recovery procedure based at least in part on the failure, wherein the failure is associated with the MCG, and wherein receiving the data comprises receiving, based at least in part on the failure, an MCG failure information message comprising an indication of one or more RLM measurement values associated with the MCG, or an indication of one or more RLM measurement values associated with the SCG, or both.

Aspect 22: The method of any of aspects 13 through 21, further comprising: receiving, from the UE, a mobility history report indicating a duration that the UE was connected with a primary secondary cell of the SCG while the state of the SCG was an activated state, a duration that the UE was connected with the primary secondary cell of the SCG while the state of the SCG was the activated state during a transition to the deactivated state, or a duration that the UE was connected with the primary secondary cell of the SCG while the state of the SCG was the deactivated state during a transition to the activated state, or any combination thereof.

Aspect 23: The method of any of aspects 13 through 22, further comprising: receiving, from the UE, an intermediate MDT report comprising one or more measurement values associated with the SCG and an indication of a corresponding state of the SCG.

Aspect 24: The method of any of aspects 13 through 23, further comprising: receiving, from the UE, a logged MDT report comprising an indication of the state of the SCG, or whether dual connectivity is configured at the UE, or both.

Aspect 25: The method of any of aspects 13 through 24, further comprising: measuring a rate at which SCG activation was requested by a network entity or the UE, a number of successful SCG activations or deactivations, a number of times random access was performed for SCG activation, a number of failed SCG activations or deactivations, an SCG activation delay, an SCG deactivation delay, a duration between consecutive SCG activation or deactivations, or a set of triggers for secondary cell activation or deactivation, or any combination thereof.

Aspect 26: An apparatus for wireless communications at a UE, comprising a processor; memory coupled with the processor; and instructions stored in the memory and executable by the processor to cause the apparatus to perform a method of any of aspects 1 through 12.

Aspect 27: An apparatus for wireless communications at a UE, comprising at least one means for performing a method of any of aspects 1 through 12.

Aspect 28: A non-transitory computer-readable medium storing code for wireless communications at a UE, the code comprising instructions executable by a processor to perform a method of any of aspects 1 through 12.

Aspect 29: An apparatus for wireless communications at a master node corresponding to an MCG within a wireless communications network, comprising a processor; memory coupled with the processor; and instructions stored in the memory and executable by the processor to cause the apparatus to perform a method of any of aspects 13 through 25.

Aspect 30: An apparatus for wireless communications at a master node corresponding to an MCG within a wireless communications network, comprising at least one means for performing a method of any of aspects 13 through 25.

Aspect 31: A non-transitory computer-readable medium storing code for wireless communications at a master node corresponding to an MCG within a wireless communications network, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
    memory; and
    at least one processor coupled to the memory, wherein the at least one processor is configured to cause the UE to:
        establish communications with a master node and a secondary node of a wireless communications network, the master node corresponding to a master cell group and the secondary node corresponding to a secondary cell group;
        collect data for optimization of the wireless communications network or based at least in part on detection of a failure associated with the master cell group or the secondary cell group, wherein the data is based at least in part on the secondary cell group being in a deactivated state;
        transmit, to a network entity comprising the secondary node or the master node, information that is based at least in part on the data, wherein the information comprises an indication of a failure type for the failure and an indication of a state of the secondary cell group, and wherein the failure type comprises one of a failure associated with radio link monitoring or a failure associated with beam failure detection; and
        transmit, to the network entity, a mobility history report, wherein the mobility history report is indicative of at least one of:
            a first duration of a first connection of the UE with a primary secondary cell of the secondary cell group while the state of the secondary cell group was an activated state,
            a second duration of a second connection of the UE with the primary secondary cell of the secondary cell group while the state of the secondary cell group was the activated state during a transition of the secondary cell group to the deactivated state, or
            a third duration of a third connection of the UE with the primary secondary cell of the secondary cell group while the state of the secondary cell group was the deactivated state during a transition of the secondary cell group to the activated state.

2. A master node corresponding to a master cell group within a wireless communications network, comprising:
    memory; and
    at least one processor coupled with the memory, wherein the at least one processor is configured to cause the master node to:
        establish communications with a user equipment (UE); and
        receive information for optimization of the wireless communications network or based at least in part on a failure associated with the master cell group or a secondary cell group corresponding to a secondary node, wherein the information is based at least in part on the secondary cell group being in a deactivated state, wherein the information comprises an indication of a failure type for the failure and an indication of a state of the secondary cell group, wherein the failure type comprises one of a failure associated with radio link monitoring or a failure associated with beam failure detection, and wherein the state is one of the deactivated state or an activated state; and
        receive, from the UE, a mobility history report, wherein the mobility history report is indicative of at least one of:

a first duration of a first connection of the UE with a primary secondary cell of the secondary cell group while the state of the secondary cell group was an activated state, a second duration of a second connection of the UE with the primary secondary cell of the secondary cell group while the state of the secondary cell group was the activated state during a transition of the secondary cell group to the deactivated state, or a third duration of a third connection of the UE with the primary secondary cell of the secondary cell group while the state of the secondary cell group was the deactivated state during a transition of the secondary cell group to the activated state.

* * * * *